(12) United States Patent
Takahashi

(10) Patent No.: US 6,295,380 B1
(45) Date of Patent: *Sep. 25, 2001

(54) OBJECT DATA PROCESSING APPARATUS, OBJECT DATA RECORDING APPARATUS, DATA STORAGE MEDIA, DATA STRUCTURE FOR TRANSMISSION

(75) Inventor: Toshiya Takahashi, Ibarakishi (JP)

(73) Assignee: Matsushita Electric Industrial Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,901

(22) Filed: Feb. 26, 1998

(30) Foreign Application Priority Data

Feb. 27, 1997 (JP) ................................................ 9-043217

(51) Int. Cl.⁷ .............................. G06K 9/36; G06K 9/70; H04N 11/02; H04N 1/41; H04B 1/66
(52) U.S. Cl. ........................ 382/240; 382/226; 382/232; 382/233; 382/243; 341/79; 348/384.1; 348/390.1; 348/408.1; 348/423.1; 358/426; 375/240
(58) Field of Search ............................... 382/166, 232, 382/240, 243, 226, 233; 348/408.1, 423.1, 384.1, 390.1; 341/79; 358/426, 433; 375/240, 240.11

(56) References Cited

U.S. PATENT DOCUMENTS

| | | | |
|---|---|---|---|
| 5,781,561 | * 7/1998 | Machida et al. | 714/752 |
| 5,915,046 | * 6/1999 | Echigo et al. | 382/248 |
| 5,930,394 | * 7/1999 | Kondo et al. | 382/232 |
| 6,002,794 | * 12/1999 | Bonneau et al. | 382/166 |
| 6,052,681 | * 4/2000 | Harvey | 707/3 |

FOREIGN PATENT DOCUMENTS

| | | |
|---|---|---|
| 0 538 061 A2 | 4/1993 | (EP) . |
| 0 737 975 A2 | 10/1996 | (EP) . |
| 7-64847 | 3/1995 | (JP) . |
| 9-91189 | 4/1997 | (JP) . |
| WO 93/21636 | 10/1993 | (WO) . |
| WO 98/36559 | 8/1998 | (WO) . |

OTHER PUBLICATIONS

Bober, et al. "Video Coding For Mobile Communications–MPEG4 Perspective", IEEE, pp. 1–9, 1996.*

* cited by examiner

*Primary Examiner*—Leo Boudreau
*Assistant Examiner*—Daniel G. Mariam
(74) *Attorney, Agent, or Firm*—Parkhurst & Wendel, L.L.P.

(57) ABSTRACT

An object data processing apparatus for decoding N pieces of coded data (N=positive integer) obtained by compressively coding N pieces of object data which constitute individual data to be recorded or transmitted and have a hierarchical structure, for each object data. This apparatus includes hierarchical information extraction means for extracting hierarchical information showing the hierarchical relationship of the N pieces of object data, according to the coded data; and table creation means for creating, according to the hierarchical information, an object table on which the respective object data are correlated with coded data of the respective object data. Therefore, the apparatus can perform extraction, selection, or retrieval of coded data corresponding to a specific object at high speed, and this enables the user to edit or replace the object data in short time with high controllability.

9 Claims, 19 Drawing Sheets

| object id | type | stream id | upper object id | lower object id | priority |
|---|---|---|---|---|---|
| Oid=1 | Video | Sid=1 | Oid=1 | 0 | 1 |
| 2 | Video | 2 | 2 | Oid=4,5,6,8 | 1 |
| 3 | Audio | 3 | 3 | 0 | 1 |
| 4 | Video | 4 | 2 | 0 | 5 |
| 5 | Video | 5 | 2 | 0 | 5 |
| 6 | H | 6, 7 | 2 | Oid=61,62 | 5 |
| 8 | Audio | 8 | 2 | 0 | 5 |

| object id | type | stream id | upper object id | lower object id | priority |
|---|---|---|---|---|---|
| Oid=61 | Video | 6 | Oid=2 | 0 | 5 |
| 62 | Video | 7 | 2 | 0 | 5 |

| object id | LC corresponding to object | stream type | stream id | upper object id | LC corresponding to upper object | lower object id | LC corresponding to lower object | common object id | priority |
|---|---|---|---|---|---|---|---|---|---|
| Oid=1 | OLC=3 | Video | Sid=1 | Oid=1 | OLC=3 | Oid=0 | OLC=0 | | |
| 2 | 4 | Video | 2 | 2 | 4 | 4,5,6,8 | 6,7,8,9 | | 1 |
| 3 | 5 | Audio | 3 | 3 | 5 | 0 | 0 | | 1 |
| 4 | 6 | Video | 4 | 2 | 4 | 0 | 0 | | 1 |
| 5 | 6 | Video | 5 | 2 | 4 | 0 | 0 | Oid=5 | 5 |
| 61 | 7 | Video | 6 | 2 | 4 | 0 | 0 | 4 | 5 |
| 62 | 8 | Video | 7 | 2 | 4 | 0 | 0 | | 5 |
| 8 | 9 | Audio | 8 | 2 | 4 | 0 | 0 | | 5 |

T1

| object id | type | stream id | upper object id | lower object id | priority |
|---|---|---|---|---|---|
| Oid=1 | Video | Sid=1 | Oid=1 | 0 | 1 |
| 2 | Video | 2 | 2 | Oid=4,5,6,8 | 1 |
| 3 | Audio | 3 | 3 | 0 | 1 |
| 4 | Video | 4 | 2 | 0 | 5 |
| 5 | Video | 5 | 2 | 0 | 5 |
| 6 | H | 6, 7 | 2 | Oid=61,62 | 5 |
| 8 | Audio | 8 | 2 | 0 | 5 |

T2a  
T2b } T2

| object id | type | stream id | upper object id | lower object id | priority |
|---|---|---|---|---|---|
| Oid=61 | Video | 6 | Oid=2 | 0 | 5 |
| 62 | Video | 7 | 2 | 0 | 5 |

| object id | stream id | data type |
|---|---|---|
| Oid=1 | Sid=1 | Video |
| 1 | 2 | Audio |
| 2 | 3 | Video |
| 2 | 4 | Video |
| 2 | 5 | Video |
| 2 | 6 | Audio |
| 3 | 7 | Video |
| 4 | 8 | Video |
| 5 | 8 | Video |

| object id | stream type | stream id | upper object id | upper stream id | lower object id | lower stream id | common object id | priority |
|---|---|---|---|---|---|---|---|---|
| 1 | H | 1,2 | 0 | 0 | 2,3 | 3,4,5,6 | | 1 |
| 2 | H | 3,4,5,6 | 1 | 1,2 | 4,5 | 8 | | 2 |
| 3 | Video | 7 | 1 | 1,2 | 0 | 0 | | 3 |
| 4 | Video | 8 | 2 | 3,4,5,6 | 0 | 0 | 5 | 4 |
| 5 | Video | 8 | 2 | 3,4,5,6 | 0 | 0 | 4 | 4 |

| object id | stream type | stream id |
|---|---|---|
| 1 | Video | 1 |
| 1 | Audio | 2 |
| 2 | Video | 3 |
| 2 | Video | 4 |
| 2 | Video | 5 |
| 2 | Audio | 6 |

| LC corresponding to stream | stream id (Sid) | LC corresponding to upper stream |
|---|---|---|
| SLC=3 | Sid=1 | SLC=2 |
| 4 | 2 | 2 |
| 5 | 3 | 2 |
| 6 | 4 | 4 |
| 6 | 5 | 4 |
| 7 | 6 | 4 |
| 8 | 7 | 4 |
| 9 | 8 | 4 |

AT

OBJECT DATA PROCESSING APPARATUS, OBJECT DATA RECORDING APPARATUS, DATA STORAGE MEDIA, DATA STRUCTURE FOR TRANSMISSION

FIELD OF THE INVENTION

The present invention relates to object data processing apparatus, object data recording apparatus, data storage media, and data structure for transmission. More particularly, the invention relates to an apparatus for decoding compressed data, such as compressed digital video data, digital audio data, and program data, an apparatus for selecting desired data from the compressed data, an apparatus for recording the compressed data, a medium storing the compressed data, an apparatus for outputting the compressed data, and a data structure for transmitting the compressed data.

BACKGROUND OF THE INVENTION

In recent years, with the progress in information compression technology, a digital video/audio service providing video information and audio information by digital signals has been put to practical use for broadcasting media, such as ground broadcasting, satellite broadcasting, and CATV.

Under the existing circumstances, as a compressive coding method for the next generation, an object coding method has attracted attention. This object coding method is not to uniformly compress the whole image, i.e., video data corresponding to a single image, but to compress video data corresponding to d single image in units of individual objects constituting the image while paying attention to the contents of the image.

When video data corresponding to a single image is subjected to the compressive coding in object units, compressed (coded) video data is separable corresponding to the respective objects, whereby a specific object in the image can be extracted or replaced.

Meanwhile, as a method of implementing a data transmission format for making the best use of the object coding method, a method of multiplexing compressed video data, audio data, and other digital data is discussed.

There is MPEG4 as an international standard of a method of multiplexing data compressed by the object coding method (ISO/IEC JTC1/SC29WG11 N1483, "System Working Draft", November 1996). Hereinafter, a description is given of the data multiplexing method based on MPEG 4 and a method for reproducing the multiplexed data, with reference to figures.

FIG. 18 is a diagram for explaining the object coding method. In the figure, reference numeral 120 designates a scene (an image) in a series of images obtained from video data with audio. This scene 120 is composed of a plurality of objects (sub-images) making a hierarchical structure. To be specific, the scene 120 is composed of three objects: a background image (background) 121, a moving object 122 that moves in the background, and a background audio 123 attendant on the c background. The moving object 122 is composed of four objects: a first wheel 124, a second wheel 125, a body 126, and a moving object audio 127 attendant on the moving object. Further, the object of body 126 is composed of two objects: a window 128 and the other part 129. In the hierarchical structure, the objects 121~123 belong to the uppermost first layer L1, the objects 124~127 belong to the second layer L2 lower than the first layer L1, and the objects 128 and 129 belong to the third layer L3 lower than the second layer L2.

In the object coding method, scene data corresponding to the scene 120 are compressively (coded in units of the lowermost objects constituting the scene 120. In other words, scene data corresponding to the scene 120 are compressively coded for each of the objects 121, 123, 124, 125, 127, 128 and 129.

FIG. 19 is a diagram for explaining a data structure for transmitting coded data corresponding to the respective objects mentioned above, which is obtained by performing object coding to the scene data of the scene 120.

In FIG. 19, MEg shows a multiplexed bit stream having a prescribed format, obtained by multiplexing coded data of the respective objects and auxiliary data. This multiplexed bit stream MEg is transmitted as coded data corresponding to the scene data.

The multiplexed bit stream MEg is partitioned into plural packets in prescribed units, i.e., each packet having prescribed number of bytes, and coded data of the respective objects are allocated to the packets having their own values (SLC=1, 2, . . . ) as logical channels (LC).

To be specific, in the multiplexed bit stream MEg shown in FIG. 19, coded video data of object [1] is allocated to packets Pa3 and Pa6 having a logical channel SLC=3, coded video data of object [2] is allocated to packets Pa5 and Pa7 having a logical channel SLC=4, and coded audio data of object [3] is allocated to a packet 4 having a logical channel SLC=5. information relating to the byte number of packet when multiplexed, the logical channel LC of each packet, and the packet transmission order is allocated as control information to a packet having another logical channel (not shown) for transmission.

The objects [1] and [2] are the background image 121 and the moving object 122 shown in FIG. 18, respectively, and the object [3] is the background audio 123 shown in FIG. 18.

In the multiplexed bit stream MEg, allocated to the packet Pal of Logical channel SLC=1 is information relating to a scene composition method for regenerating the scene composed of the respective objects (composition stream), and allocated to the packet Pa2 of logical channel SLC=2 is information showing how the coded data of the respective objects are multiplexed (stream association table).

Accordingly, when a plurality of coded data obtained by object coding are multiplexed and transmitted, with the coded data of the respective objects, the composition stream showing the structure of a scene composed of the objects and the stream association table showing the correlation of the transmitted streams (each stream being a series of coded data corresponding to each object) are transmitted simultaneously.

FIG. 20 is a diagram for explaining a scene description according to the composition stream, illustrating a description SD corresponding to the single image (scene) 120 shown in FIG. 18.

In the scene description SD according to the composition stream, the image 120 is shown by Scene 140, and the fact that the image 120 shown by Scene 140 is composed of the background image 121, the moving object 122, and the background audio 123 is shown by Video(1) 141, Node(1) 142, and Audio(1) 143, respectively. Here, Scene 140, Video(1) 141, Node(1) 142, and Audio(1) 143 are descriptors describing the image 120, the background image 121, the moving object 122, and the background audio 123 shown in FIG. 18, respectively.

Further, in the scene description SD, the fact that the moving object 122 shown by Node(1) 142 is composed of the first wheel 124, the second wheel 125, the body 126, and the moving object audio 127 is shown by Video(2) 144, Video(3) 145, Node(2) 146, and Audio(2) 147, respectively, which are descriptors corresponding to these objects.

Further, the fact that the body 126 shown by Node(2) 146 is composed of the window 128 and the other part 129 is shown by Video(4) 148 and Video(5) 149, respectively, which are descriptors corresponding to these objects.

Each of the descriptors is given a stream index (stream id) for identifying a stream corresponding to coded data of each object in the multiplexed bit stream MEg. To be specific, as shown in FIG. 20, stream indices Sid=1~Sid=5 are given to the descriptors 141~145, respectively, and stream indices Sid=6, Sid=7, and Sid=8 are given to the descriptors 148, 149, and 147, respectively. Sid is a specific number of each stream id.

Accordingly, it can be seen from the scene description SD according to the composition stream that a scene is composed of what kinds of objects. However, the scene description SD according to the composition stream does not describe how the coded data corresponding to the respective objects are multiplexed in the actual multiplexed bit stream MEg.

FIG. 21 is a diagram for explaining the stream association table AT.

The stream association table AT shows the relationship between the stream corresponding to coded data of each object (i.e., a series of coded data corresponding to each object) and the logical channel (LC) specifying each packet which is the partition unit of coded data when multiplexed. To be specific, on this table AT, the stream indices (id) of the respective streams, the logical channel values (LC) corresponding to the respective streams, and the logical channel values (LC) corresponding to upper streams of the respective streams are correlated with each other. Here, the logical channel, LC corresponding to the upper stream of the streams (Sid=1~3) corresponding to the objects 121~123 of the first layer L1 corresponds to the logical channel LC (SLC=2) of the packet Pa2 to which the stream association table is allocated.

Accordingly, with reference to this table AT, the logical channel LC corresponding to each stream and the logical channel LC of its upper stream (host stream) can be specified.

As described above, since the stream indices (Sid) are added to the descriptors 141~145 and 147~149 of the respective objects in the scene description SD according to the composition stream shown in FIG. 20, the respective objects can be identified by the stream indices (Sid) from the composition stream and, therefore, the composition stream can be correlated with the stream association table shown in FIG. 21.

As described above, the multiplexed bit stream MEg includes the composition stream and the stream association table together with the coded data corresponding to the respective objects. Therefore, when the coded data of the respective objects are reproduced by decoding according to the multiplexed bit stream MEg, it is possible to extract or retrieve coded data of a specific object designated according to the composition stream and the stream association table. This enables, for example, edition of the objects 121 to 129 constituting the scene 120 on the reproduction end.

In the multiplexed bit stream format according to the prior art object coding, the scene description is expressed as information (composition stream) separated from information relating to the multiplexed state of the respective coded data and the logical channels corresponding to the respective streams (stream association table). The reason is as follows. In order to realize exchange of the contents of streams corresponding to the respective objects and to facilitate interface between the multiplexed bit stream and applications treating this multiplexed bit stream without changing the scene composition (i.e., the hierarchical structure of the objects constituting a scene), the structure for multiplexing, which depends on the physical layer of the multiplexed bit stream, must be separated from main information (coded data) included in the multiplexed bit stream.

However, the multiplexed bit stream format according to the prior art has the following drawbacks.

A great advantage of object coding resides in that it enables extraction of coded data of a specific object from the multiplexed bit stream, and retrieval of a specific object on the data base containing the multiplexed bit stream.

However, in order to recognize coded data of individual objects from the multiplexed bit stream MEg of the above-mentioned structure, a complicated procedure is required as follows. For example, to recognize coded data of lower-layer objects from plural objects having a hierarchical structure, initially, the scene description according to the composition stream included in the multiplexed bit stream MEg is interpreted to find an object corresponding to a node, and a stream corresponding to a lower object being a component of the object (node) is specified. Then, the stream association table AT is interpreted and, according to the stream id of the specified stream, a logical channel LC corresponding to the stream id is found. Thereby, coded data of the specified object can be extracted from the multiplexed bit stream MEg.

Furthermore, since the hierarchical relationship of the streams corresponding to the respective objects can be seen from the stream association table AT, it is possible to analogize coded data of a specific object according to the stream association table AT alone, but this analogy takes time and is not reliable.

That is, oil the stream association table AT, information relating to objects as nodes is not clearly defined. In addition, since this table AT does not show the type of stream corresponding to coded data (for example, whether a stream corresponds to video data or audio data), other information such as the composition stream should be referred to. Further, for each stream, only its upper stream is known from the table AT. So, it is impossible to uniquely know that coded data of each object is composed of which stream, and interpretation takes time.

For example, in the scene description SD according to the composition stream shown in FIG. 20, although Node(2) 146 corresponding to the subject 126 exists, a stream corresponding to Node(2) does not exist. So, on the stream association table AT shown in FIG. 21, an entry corresponding to Node(2) (i.e., stream id, LC corresponding to the stream, and LC corresponding to the stream's upper-layer stream) does not exists.

Accordingly, in order to extract the object 126 corresponding to Node(2), initially, stream indices (id) corresponding to the lower-layer objects 128 and 129 of Node(2) 146 must be decided on the basis of the scene description SD according to the composition stream (refer to FIG. 20) and, thereafter, the logical channels (LC) of packets containing the streams having the decided stream indices must be defined on the stream association table AT (refer to FIG. 21).

Further, there is a case where coded data corresponding to plural objects are transmitted without being multiplexed in a particular transmission medium, such as computer network (internet). In this case, the bit stream has a data structure including no logical channels, and does not include the stream association table.

In this case, detection of a specific object from the bit stream is carried out by interpreting the hierarchical structure of the objects on the basis of the scene description SD according to the composition stream. However, when the number of the objects increases considerably, it requires a lot of time to interpret the hierarchical structure of the objects on the basis of the composition stream, resulting in poor controllability in replacement or edition of objects in a scene.

SUMMARY OF THE INVENTION

It is an object of the present invention to provide an object data processing apparatus that speedily performs extraction, selection, or retrieval of coded data corresponding to a specific object from coded data corresponding to plural objects, whereby the user can edit or replace object data in short time with high controllability.

It is another object of the present invention to provide an object data recording apparatus that records coded data corresponding to plural objects so that coded data of a specific object among the plural objects can be extracted, selected, or retrieved easily and speedily.

It is still another object of the present invention to provide a data storage medium containing coded data having a data structure, which data structure realizes simple and speedy extraction, selection, or retrieval of coded data of a specific object from coded data corresponding to plural objects.

It is a further object of the present invention to provide a data structure for transmission that realizes simple and speedy extraction, selection, or retrieval of coded data of a specific object from coded data corresponding to plural objects.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an object data processing apparatus for decoding N pieces of coded data (N=positive integer) obtained by compressively coding N pieces of object data which constitute individual data to be recorded or transmitted and have a hierarchical structure, for each object data. This apparatus includes hierarchical information extraction means for extracting hierarchical information showing the hierarchical relationship of the N pieces of object data, according to the coded data; and table creation means for creating, according to the hierarchical information, an object table on which the respective object data are correlated with coded data corresponding to the respective object data. Therefore, extraction, selection or retrieval of coded data of a specific object can be carried out easily and speedily, and this enables the user to edit or replace the object data in short time with high controllability.

According to a second aspect of the present invention, there is provided an object data processing apparatus for decoding N pieces of coded data (N=positive integer) obtained by compressively coding scene data corresponding to one scene, for each of N pieces of objects constituting the scene. This apparatus includes hierarchical information extraction means for extracting hierarchical information showing the hierarchical relationship of the respective objects constituting the scene, according to the coded data; and table creation means for creating, according to the hierarchical information, an object table on which the respective objects are correlated with coded data corresponding to the respective objects. Therefore, on the decoder side, extraction, selection or retrieval of a specific object from plural objects (video and audio) constituting one scene can be carried out easily and speedily with reference to the object table.

According to a third aspect of the present invention, in the object data processing apparatus according to the second aspect, the hierarchical information extraction means is constructed so that it extracts priority information showing the priority order of the respective objects, according to the coded data, in addition to the hierarchical information; and the table creation means is constructed so that it creates, according to the hierarchical information and the priority information, an object table on which the respective objects are correlated with coded data corresponding to the respective objects and the priority order of the respective objects are shown. Therefore, when the throughput of the decoding apparatus is low and the apparatus cannot decode coded data of all objects, only objects having priorities higher than a prescribed priority are subjected to decoding.

According to a fourth aspect of the present invention, the object data processing apparatus according to the second aspect. further includes identification information detection means for detecting identification information for identifying coded data of a specific object designated, with reference to the object table; and decoding means for extracting coded data of the specific object from the N pieces of coded data according to the identification information, and decoding the extracted coded data. Therefore, in the decoding apparatus, retrieval of an object specified by the user is facilitated.

According to a fifth aspect of the present invention, there is provided an object data processing apparatus for decoding multiplexed data including N pieces of coded data (N=positive integer) obtained by compressively coding scene data corresponding to one scene, for each of N pieces of objects constituting the scene. This apparatus includes hierarchical information extraction means for extracting hierarchical information showing the hierarchical relationship of the N pieces of objects constituting the scene, according to information showing the correlation of the respective coded data and included in the multiplexed data; and table creation means for creating, according to the hierarchical information, an object table on which the respective objects are correlated with coded data corresponding to the respective objects. Therefore, extraction, selection or retrieval of a specific object from plural objects (video and audio) constituting one scene can be carried out easily and speedily, on the basis of the multiplexed data, with reference to the object table.

According to a sixth aspect of the present invention, in the object data processing apparatus according to the fifth aspect, the hierarchical information extraction means is constructed so that it extracts priority information showing the priority order of the respective objects, according to the multiplexed data, in addition to the hierarchical information; and the table creation means is constructed so that it creates, according to the hierarchical information and the priority information, an object table on which the respective objects are correlated with coded data corresponding to the respective objects and the priority order of the respective objects are shown. Therefore, when the throughput of the decoding apparatus is low and the apparatus cannot decode coded data of all objects, only objects having priorities higher than a prescribed priority are subjected to decoding.

According to a seventh aspect of the present invention, the object data processing apparatus according to the fifth aspect further includes identification information detection means for detecting identification information for identifying coded data of a specific object designated, with reference to the object table; and decoding means for extracting coded data of the specific object from the multiplexed data according to the identification information, and decoding the extracted coded data. Therefore, in the decoding apparatus, retrieval of an object specified by the user is facilitated.

According to an eighth aspect of the present invention, there is provided an object data processing apparatus for selecting coded data of a specific object data from N pieces of coded data (N=positive integer) obtained by compressively coding N pieces of object data which constitute individual data to be recorded or transmitted and have a hierarchical structure, for each object data. This apparatus includes hierarchical information extraction means for extracting hierarchical information showing the hierarchical relationship of the N pieces of object data, according to the coded data; and table creation means for creating, according to the hierarchical information, an object table on which the respective object data are correlated with coded data corresponding to the respective object data. This apparatus selects coded data of a specific object data from the N pieces of coded data with reference to the object table and outputting the selected coded data. Therefore, selection of coded data of a specific object can be carried out easily and speedily, and this enables the user to edit, replace, or retrieve the object data in short time with high controllability.

According to a ninth aspect of the present invention, there is provided an object data processing apparatus for selecting coded data of a specific object from N pieces of coded date (N=positive integer) obtained by compressively coding scene data corresponding to one scene, for each of N pieces of objects constituting the scene. This apparatus includes hierarchical information extraction means for extracting hierarchical information showing the hierarchical relationship of the respective objects constituting the scene, according to the coded data; and table creation means for creating, according to the hierarchical information, an object table on which the respective objects are correlated with coded data corresponding to the respective objects. This apparatus selects coded data of a specific object from the N pieces of coded data with reference to the object table and outputting the selected coded data. Therefore, on the decoder side, selection of a specific object from plural objects (video and audio) constituting one scene can be carried out easily and speedily.

According to a tenth aspect of the present invention, there is provided an object data processing apparatus for selecting coded data of a specific object from multiplexed data including N pieces of coded data (N=positive integer) obtained by compressively coding scene data corresponding to one scene, for each of N pieces of objects constituting the scene. This apparatus includes hierarchical information extraction means for extracting hierarchical information showing the hierarchical relationship of the respective objects constituting the scene, according to information showing the correlation of the respective coded data and included in the multiplexed data; and table creation means for creating, according to the hierarchical information, an object table on which the respective objects are correlated with coded data corresponding to the respective objects. This apparatus selects coded data of a specific object from the multiplexed data with reference to the object table and outputting the selected coded data. Therefore, on the basis of the multiplexed data, selection of a specific object from plural objects (video and audio) constituting one scene can be carried out easily and speedily.

According to an eleventh object of the present invention, there is provided an object data recording apparatus having a data storage for storing data, and recording N pieces of coded data (N=positive integer) in the data storage, which coded data are obtained by compressively coding N pieces of object data which constitute individual data to be recorded or transmitted and have a hierarchical structure, for each object data. This apparatus includes hierarchical information extraction means for extracting hierarchical information showing the hierarchical relationship of the respective object data, according to the coded data; and table creation means for creating, according to the hierarchical information, an object table on which the respective object data are correlated with coded data corresponding to the respective object data. This apparatus records the N pieces of coded data and the object table corresponding to these coded data in the data storage. Therefore, extraction, selection or retrieval of coded data of a specific object can be carried out easily and speedily with reference to the object table.

According to a twelfth aspect of the present invention, there is provided an object data recording apparatus having a data storage for storing data, aged recording N pieces of coded data (N=positive integer) in the data storage, which coded data are obtained by compressively coding scene data corresponding to one scene, for each of N pieces of objects constituting the scene. This apparatus includes hierarchical information extraction means for extracting hierarchical information showing the hierarchical relationship of the respective objects constituting the scene, according to the coded data; and table creation means for creating, according to the hierarchical information, an object table on which the respective objects are correlated with coded data corresponding to the respective objects. This apparatus records the N pieces of coded data and the object table corresponding to these coded data in the data storage. Therefore, on the decoder side, extraction, selection or retrieval of a specific object from plural objects (video and audio) constituting one scene can be performed easily and speedily with reference to the object table.

According to a thirteenth aspect of the present invention, in the object data recording apparatus according to the twelfth aspect, the object table corresponding to the N pieces of coded data is added to the N pieces of coded data when being recorded. Therefore, management of the recorded object table is facilitated.

According to a fourteenth aspect of the present invention, in the object data recording apparatus according to the twelfth aspect, the object table corresponding to the N pieces of coded data is separated from the N pieces of coded data when being recorded. Therefore, regardless of the size of the coded data, recording of the object table to a storage medium is carried out with high reliability.

According to a fifteenth aspect of the present invention, there is provided an object data recording apparatus having a data storage for storing data, and recording multiplexed data including N pieces of coded data (N=positive integer) in the data storage, which coded data are obtained by compressively coding scene data corresponding to one scene, for each of N pieces of objects constituting the scene.

This apparatus includes hierarchical information extraction means for extracting hierarchical information showing the hierarchical relationship of the respective objects constituting the scene, according to information showing the correlation of the respective coded data and included in the multiplexed data; and table creation means for creating, according to the hierarchical information, an object table on which the respective objects are correlated with coded data corresponding to the respective objects. This apparatus records the multiplexed data and the object table corresponding to the multiplexed data in the data storage. Therefore, on the decoder side, extraction, selection or retrieval of a specific object from plural objects (video and audio) constituting one scene can be performed easily and speedily with reference to the object table.

According to a sixteenth aspect of the present invention, in the object data recording apparatus according to the fifteenth aspect, the object table corresponding to the multiplexed data is added to the multiplexed data when being recorded. Therefore, management of the recorded object table is facilitated.

According to a seventeenth aspect of the present invention, in the object data recording apparatus according to the fifteenth aspect, the object table corresponding to the multiplexed data is separated from the multiplexed data when being recorded. Therefore, regardless of the size of the multiplexed data, recording of the object table in a storage medium is carried out with high reliability.

According to an eighteenth aspect of the present invention, there is provided a data storage medium containing relevant data relating to individual data to be recorded or transmitted, wherein the relevant data includes an object table on which N pieces of object data (N=positive integer) constituting the individual data and having a hierarchical structure are correlated with N pieces of coded data obtained by compressively coding the respective object data. Therefore, extraction, selection or retrieval of specific object data from the individual data can be carried out easily and speedily with reference to the object table.

According to a nineteenth aspect of the present invention, there is provided a data storage medium containing relevant data corresponding to one scene, wherein the relevant data includes an object table on which N pieces of coded data (N=positive integer) obtained by compressively coding scene data corresponding to one scene for each of N pieces of objects constituting the scene are correlated with the respective objects. Therefore, on the decoder side, extraction, selection or retrieval of a specific object from plural objects (video and audio) constituting one scene can be performed easily and speedily with reference to the object table.

According to a twentieth aspect of the present invention, there is provided an object data processing apparatus for outputting N pieces of coded data (N=positive integer) obtained by compressively coding N pieces of object data which constitute individual data to be recorded or transmitted and have a hierarchical structure, for each object data. This apparatus includes hierarchical information extraction means for extracting hierarchical information showing the hierarchical relationship of the N pieces of object data, according to the coded data; and table creation means for creating, according to the hierarchical information, an object table on which the respective object data are correlated with coded data corresponding to the respective object data. This apparatus outputs the N pieces of coded data to which the object table corresponding to these coded data is added. Therefore, it is not necessary to create an object table on the decoder side, whereby edition, replacement or retrieval of object data can be performed by a simple structure, in short time with high controllability.

According to a twenty-first aspect of the present invention, there is provided an object data processing apparatus for outputting N pieces of coded data (N=positive integer) obtained by compressively coding scene data corresponding to one scene, for each of N pieces of objects constituting the scene. This apparatus includes hierarchical information extraction means for extracting hierarchical information showing the hierarchical relationship of the respective objects constituting the scene, according to the coded data; and table creation means for creating, according to the hierarchical information, an object table on which the respective objects are correlated with coded data corresponding to the respective objects. This apparatus outputs the N pieces of coded data to which the object table corresponding to these coded data is added. Therefore, it is riot necessary to create an object table on the decoder side, whereby edition, replacement or retrieval of objects (video and audio) constituting one scene can be performed by a simple structure, in short time with high controllability.

According to a twenty-second aspect of the present invention, there is provided an object data processing apparatus for decoding data output from the object data processing apparatus according to the twenty-first aspect. This apparatus includes data separation means for separating the object table from the output data; and table storage means for storing the separated object table. In this apparatus, decoding of the coded data corresponding to the respective objects is controlled using the information shown in the object table stored in the table storage means. Therefore, it is possible to realize a decoding apparatus of simple structure that can perform edition, replacement or retrieval of objects (video and audio) constituting one scene in short time with high controllability.

According to a twenty-third aspect of the present invention, there is provided an object data processing apparatus for outputting multiplexed data including N pieces of coded data (N=positive integer) obtained by compressively coding scene data corresponding to one scene, for each of N pieces of objects constituting the scene. This apparatus includes hierarchical information extraction means for extracting hierarchical information showing the hierarchical relationship of the respective objects constituting the scene, according to information showing the correlation of the respective coded data included in the multiplexed data; and table creation means for creating, according to the hierarchical information, an object table on which the respective objects are correlated with coded data corresponding to the respective objects. This apparatus outputs the multiplexed data to which the object table corresponding to the multiplexed data is added. Therefore, it is not necessary to create an object table on the decoder side, whereby edition, replacement or retrieval of objects (video and audio) constituting one scene can be performed by a simple structure, in short time with high controllability.

According to a twenty-fourth aspect of the present invention, there is provided an object data processing apparatus for decoding data output from the object data processing apparatus according to the twenty-third aspect. This apparatus includes data separation means for separating the object table from the output data; and table storage means for storing the separated object table. In this apparatus, decoding of the coded data corresponding to the respective objects is controlled using the information shown in the object table stored in the table storage means. Therefore, it is possible to realize a decoding apparatus of simple structure that can perform edition, replacement or retrieval of objects (video and audio) constituting one scene in short time with high controllability.

According to a twenty-fifth aspect of the present invention, there is provided a data structure for transmitting N pieces of coded data (N=positive integer) obtained by compressively coding N pieces of object data which constitute individual data to be recorded or transmitted and have a hierarchical structure, for each object data. In this data structure, a data group comprising the N pieces of coded data includes an object table on which the respective object data are correlated with coded data corresponding to the respective object data. Therefore, extraction, selection or retrieval of coded data corresponding to a specific object can be carried out easily and speedily with reference to the object table.

According to a twenty-sixth aspect of the present invention, there is provided a data structure for transmitting N pieces of coded data (N=positive integer) obtained by compressively coding scene data corresponding to one scene, for each of N pieces of objects constituting the scene. In this data structure, a data group comprising the N pieces of coded data includes an object table on which the respective objects are correlated with coded data corresponding to the respective objects. Therefore, on the decoder side, extraction, selection or retrieval of a specific objected from plural objects (video and audio) constituting one scene can be carried out easily and speedily with reference to the object table.

According to a twenty-seventh aspect of the present invention, there is provided an object data processing apparatus for processing multiplexed data including N pieces of coded data (N=positive integer) and being partitioned into plural packets each having a prescribed code quantity, which coded data are obtained by compressively coding N pieces of object data which constitute individual data to be recorded or transmitted and have a hierarchical structure, for each object data. This apparatus includes hierarchical information extraction means for extracting hierarchical information showing the hierarchical relationship of the N pieces of object data, according to information showing the correlation of the respective coded data and included in the multiplexed data; and table creation means for creating, according to the hierarchical information, an object table showing the hierarchical relationship of the plural packets constituting the multiplexed data. Therefore, extraction, selection or retrieval of coded data corresponding to a specific object on the basis of the multiplexed data can be carried out easily and speedily with reference to the object table, and this enables the user to edit or replace the object data in short time with high controllability.

According to a twenty-eighth aspect of the present invention, there is provided an object data processing apparatus for processing multiplexed data including N pieces of coded data (N=positive integer) and being partitioned into plural packets each having a prescribed code quantity, which coded data are obtained by compressively coding scene data corresponding to one scene, for each of N pieces of objects constituting the scene. This apparatus includes hierarchical information extraction means for extracting hierarchical information showing the hierarchical relationship of the respective objects constituting the scene, according to information showing correlation of the respective coded data included in the multiplexed data; and table creation means for creating, according to the hierarchical information, an object table showing the hierarchical relationship of the plural packets constituting the multiplexed data. Therefore, extraction, selection or retrieval of a specific object from plural objects (video and audio) constituting one scene on the basis of the multiplexed data can be carried out easily and speedily with reference to the object table.

According to a twenty-ninth aspect or the present invention, there is provided an object data recording apparatus having a data storage for storing data, and recording, in the storage, multiplexed data which includes N pieces of coded data (N=positive integer) and is partitioned into plural packets each packet having a prescribed coded quantity, which coded data are obtained by compressively coding N pieces of object data which constitute individual data to be recorded or transmitted and have a hierarchical structure, for each object data. This apparatus includes hierarchical information extraction means for extracting hierarchical information showing the hierarchical relationship of the N pieces of object data, according to information showing the correlation of the respective coded data and included in the multiplexed data; and table creation means for creating, according to the hierarchical information, an object table showing the hierarchical relationship of the plural packets constituting the multiplexed data. This apparatus records the multiplexed data and the object table corresponding to the multiplexed data in the data storage. Therefore, extraction, selection or retrieval of coded data corresponding to a specific object can be carried out easily and speedily with reference to the object table.

According to a thirtieth aspect of the present invention, there is provided an object data recording apparatus having a data storage for storing data, and recording, in the data storage, multiplexed data which includes N pieces of coded data (N—positive integer) and is partitioned into plural packets each having a prescribed coded quantity, which coded data are obtained by compressively coding scene data constituting one scene, for each of N pieces of objects constituting the scene. This apparatus includes hierarchical information extraction means for extracting hierarchical information showing the hierarchical relationship of the respective objects constituting the scene, according to information showing the correlation of the respective coded data and included in the multiplexed data; and table creation means for creating, according to the hierarchical information, an object table showing the hierarchical relationship of the plural packets constituting the multiplexed data. This apparatus records the multiplexed data and the object table corresponding to the multiplexed data in the data storage. Therefore, on the decoder side, extraction, selection or retrieval of a specific object from plural objects (video and adagio) constituting one scene can be carried out easily and speedily with reference to the object table.

BRIEF DESCRIPTION OF THE DRAWINGS

FIGS. 15(a) and 15(b) are diagrams showing an object table obtained from the scene description shown in FIG. 14(a) and the object descriptors shown in FIG. 14(b).

FIGS. 17(a)–17(c) are diagrams for explaining a data storage medium according to the present invention, wherein FIG. 17(a) shows the structure of a floppy disk, FIG. 17(b) shows the structure of a floppy disk body, and FIG. 17(c) shows a computer system using the floppy disk as a storage medium.

DETAILED DESCRIPTION OF THE PREFERRED EMBODIMENTS

[Embodiment 1]

Figure 1:
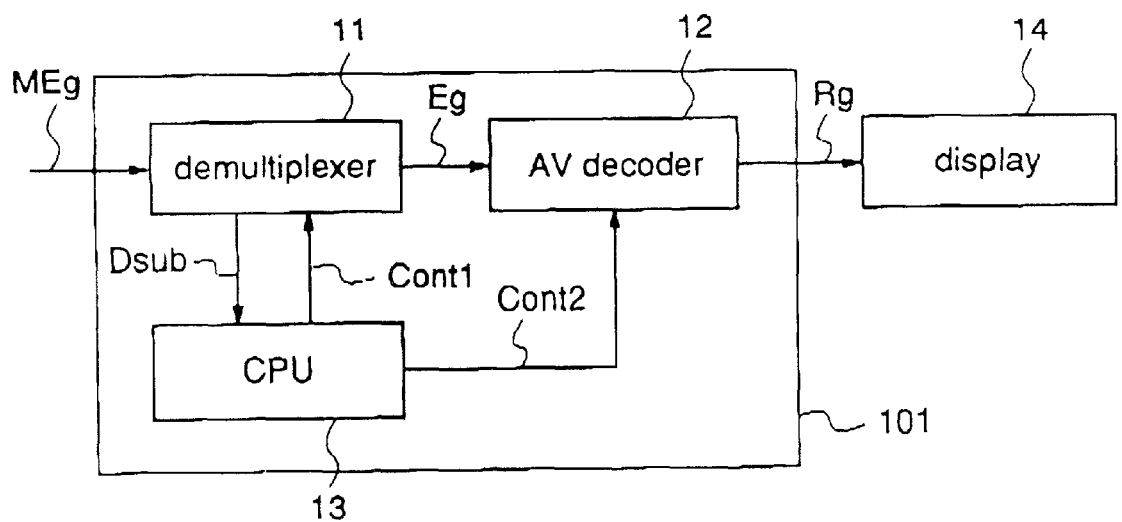
FIG. 1 is a block diagram for explaining an object data decoding apparatus as an object data processing apparatus according to a first embodiment of the present invention.

FIG. 1 is a block diagram illustrating an object data decoding apparatus as an object data processing apparatus according to a first embodiment of the present invention.

In FIG. 1, an object data decoding apparatus 101 receives coded data corresponding to a single image (scene), performs decoding of the coded data, and outputs regeneration data obtained by the decoding to the display unit 14. The coded data is identical to the multiplexed bit stream MEg shown in FIG. 19 in which coded data obtained by object coding of scene data corresponding to a single scene comprising plural objects are multiplexed with auxiliary data. The single scene corresponds to an image of each frame constituting a motion picture. The object data decoding apparatus 101 successively decodes coded data of each frame input thereto, and successively outputs regeneration data corresponding to each frame.

More specifically, the object data decoding apparatus 101 includes demultiplexer 11 and an AV (audio/video) decoder 12. The demultiplexer 11 selects and extracts a composition stream and a stream association table which are auxiliary data Dsub included in the multiplexed bit stream Meg, and outputs coded data Eg corresponding to the respective objects in the multiplexed bit stream MEg, in units of the respective objects, according to a first control signal Cont1. The AV decoder 12 decodes the coded data Eg corresponding to each object according to a second control signal Cont2, and outputs regeneration data Rg corresponding to each scene. Further, the decoding apparatus 101 includes a CPU (central processing unit) 13. The CPU 13 decides a logical channel of a packet containing the coded data Eg of each object according to the stream association table, and supplies the first control signal Cont1 to the demultiplexer 11 according to the result of the decision. Further, the CPU 13 supplies information relating to location of each object in one scene and information relating to display start time of each object, as the second control signal Cont2, to the AV decoder 12, on the basis of a scene description according to the composition stream.

In this first embodiment, the CPU 13 creates an object table showing the correspondences between the respective objects constituting one scene and coded data Eg of the respective objects in the multiplexed bit stream MEg, on the basis of the composition stream and the stream association table, and stores this table in a data storage inside the CPU 13.

Figure 2:
FIG. 2 is a diagram showing an object table created by the object data decoding apparatus according to the first embodiment.
Figure 18:
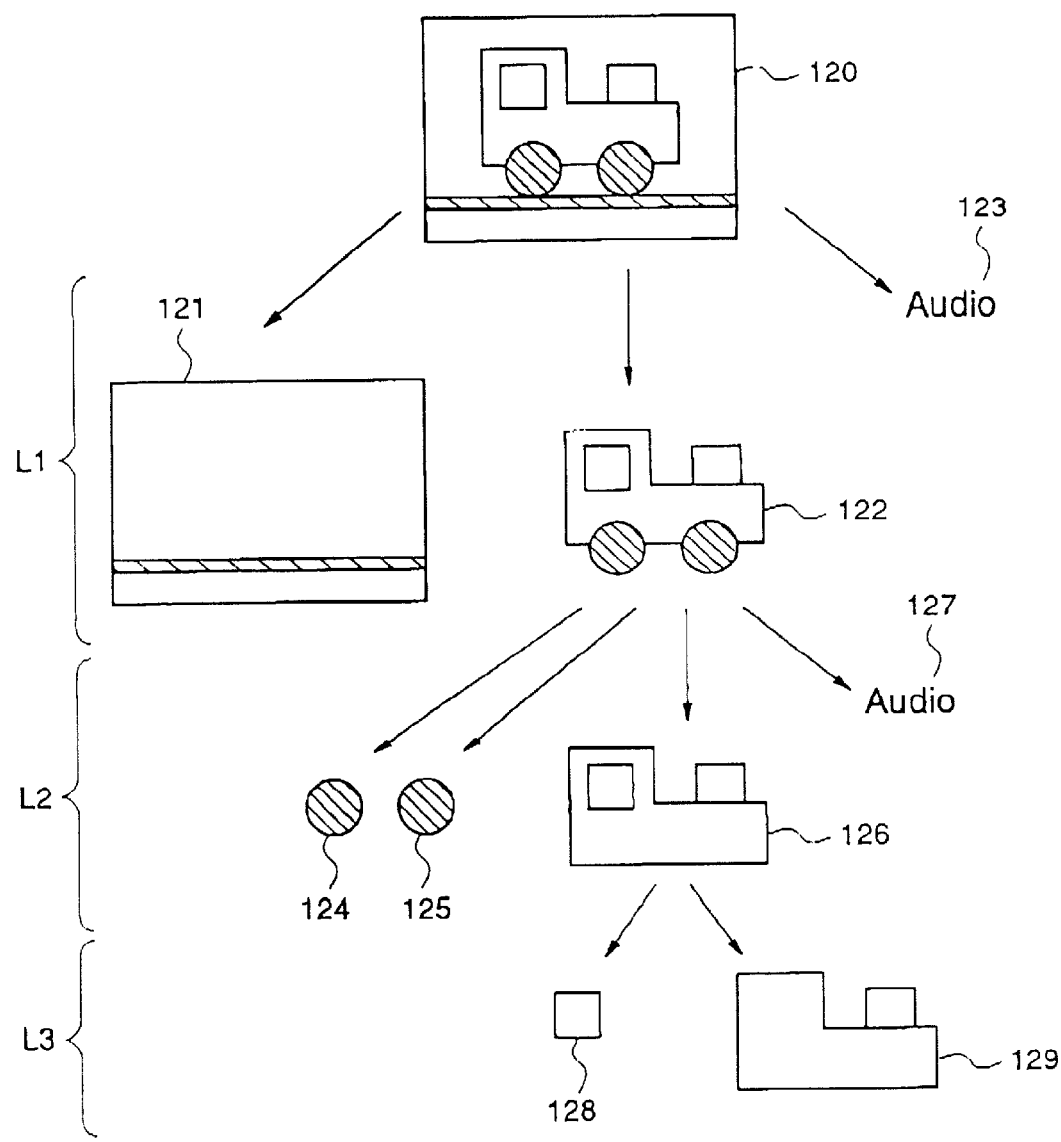
FIG. 18 is a schematic diagram for explaining an object coding method according to the prior art.

FIG. 2 is a diagram for explaining an object table T1 corresponding to the scene 120 shown in FIG. 18.

On this object table T1, various kinds of information are entered, correlated with each object index (object id) which is an index fur identifying each object being a constituent of the scene. Each object has its own value Oid as its object index.

Figures 20, 21:
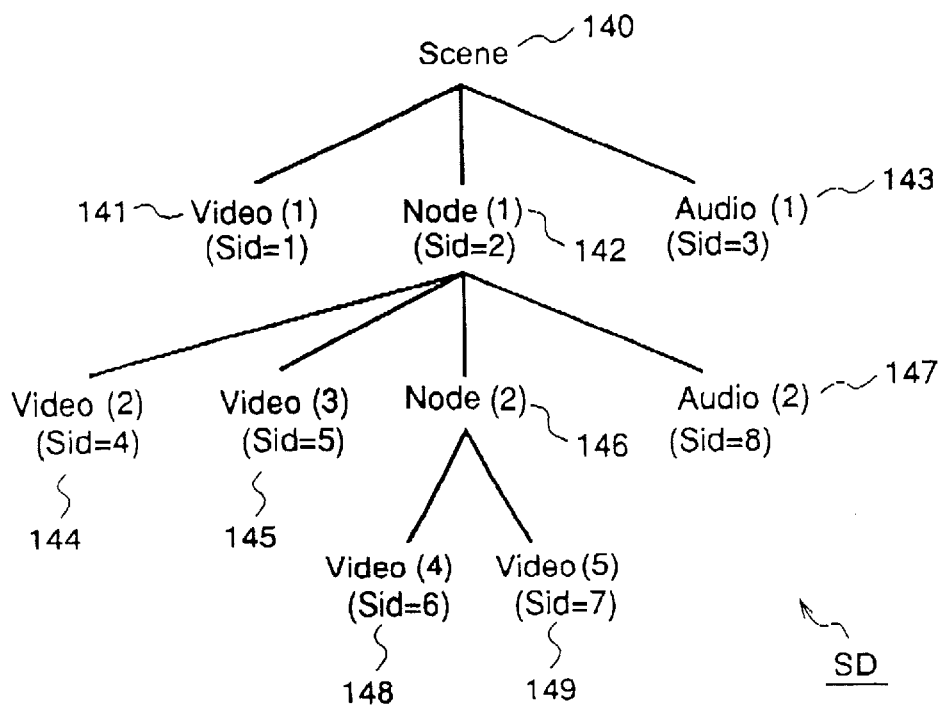
FIG. 20 is a diagram showing a scene description according to a composition stream included in the bit stream shown in FIG. 17 as auxiliary data.
FIG. 21 is a diagram showing a stream association table included in the bit stream shown in FIG. 17 as auxiliary data.

To be specific, object indices are uniquely given to the respective object descriptors in the scene description shown in FIG. 20, and entered to the object table T1 in the order of the object id values Oid.

In FIG. 2, object indices Oid=1 to Oid=5 are given to the descriptors 141 to 145 of the objects 121 to 125 shown in FIG. 20, respectively, and object indices Oid=61 and Oid=62 are given to the descriptors 148 and 149 of the objects 128 and 129 shown in FIG. 20, respectively. Further, an object index Oid=8 is given to the descriptor 147 of the object 127 shown in FIG. 20.

On the object table T1, correlated with each object index (id), the following components are entered: a logical channel (LC) corresponding to the object; the stream type (i.e., whether the stream is video or audio); a stream index corresponding to the object; indices of upper and lower objects corresponding to the object; logical channels of the upper and lower objects; the index of an object which shares its logical channel with the object (common object id in FIG. 2), and the priority order of the respective objects. In FIG. 2, OLC is a specific value of logical channel LC.

An upper object of each object is an object which belongs to an upper layer in the hierarchical structure than a layer to which each object belongs. A lower object of each object is an object which belongs to a lower layer than a layer to which each object belongs.

To be specific, the uppermost object, i.e., an upper object of the objects belonging to the first layer L1 in FIG. 18, is the object itself. So, the uppermost object has its object id value Oid=1 and its logical channel value OLC=3 for its upper object id value Oid and its upper object logical channel value OLC. Further, the upper objects of the respective objects belonging to the second layer L2 and the third layer L3 in FIG. 18 are the objects belonging to the first layer L1 and composed of the objects of the second and third layers L2 and L3. Further, objects having no lower objects (lowermost objects) have lower object id values Oid=0. In this first embodiment, a specific objects being the uppermost object is shown by giving its object id as its upper object id, and a specific object's being the lowermost object is shown by giving Oid=0 as its lower object id. However, a special digit or symbol may be used for describing that a specific object is the uppermost or lowermost object.

From the object table T1 so constructed, it can be seen that the object having Oid=2 as its object id is composed of four objects because "Oid=4, 5, 6, 8" is described as its lower object id.

Further, in FIG. 2, for the object 128 (129) which is a component of the object 126 corresponding to a node having no stream (in the description of FIG. 20, Node(2) 146), its object id is given as follows. That is, a digit showing that this is a node common to some objects is given as the upper column of its Oid, and a digit showing its actual object id value is given as the lower column of the Oid.

Accordingly, from the object table T1, it is found that the object 126 having its object id value Oid=6 is merely a node and there exists no coded data corresponding to this node, and the stream of this object 126 is composed of the streams of the objects 128 and 129 having object ids Oid=61 and Oid=62, i.e., the streams of Sid=6 and Sid=7, respectively.

Further, the object 122 having Oid=2 as its object id corresponds to a node, like the object 126 having Oid=6 as its object id. However, since this object 122 is definitely described on the object table T1, there exists a stream corresponding to this object 122, i.e., the stream of Sid=2.

Information included in a stream corresponding to a node is information common to all objects belonging to the node, for example, composition information peculiar to the objects, such as common system clock, display start timing, decoding start time, and display position, and copyright information.

A description is now given of the operation of the object data decoding apparatus 101.

Figure 19:
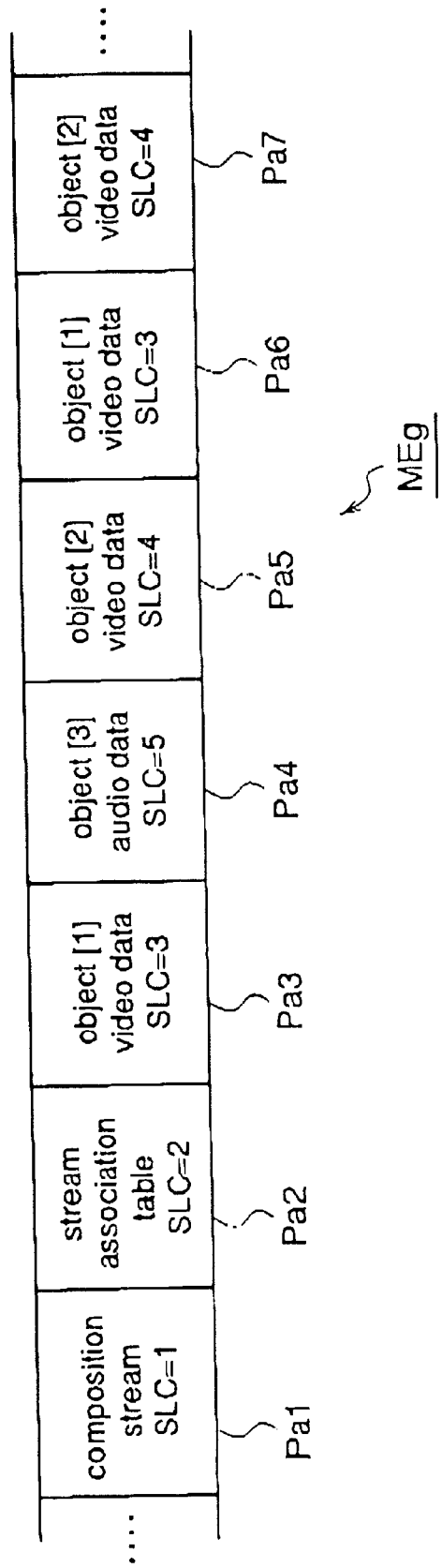
FIG. 19 is a diagram showing a data structure of a bit stream obtained by multiplexing data coded by the prior art object coding method and auxiliary data.

When the multiplexed bit stream MEg shown in FIG. 19 is input to the object data decoding apparatus 101, the composition stream and the stream association table (auxiliary data Dsub) are extracted from the multiplexed bit stream MEg and supplied to the CPU 13 by the demultiplexer 11.

In the CPU 13, the correspondences between the respective objects constituting the scene 120 shown in FIG. 19 and their logical channels LC are recognized and, according to the recognition, a first control signal Cont1 is output to the demultiplexer 11.

In the demultiplexer 11., according to the first control signal Cont1, streams corresponding to the respective objects, which are allocated to plural packets in the multiplexed bit stream, are output to the AV decoder 12 in object units.

At this time, in the CPU 13, information relating to each object's display position and display start time is extracted from the scene description according to the composition stream, and the extracted information is output to the AV decoder 12 as a second control signal Cont2.

In the AV decoder 12, a stream (a series of coded data Eg) corresponding to each object output from the demultiplexer 11 is subjected to decoding. Decoded data corresponding to the respective objects are composted according to the second control signal Cont2 from the CPU 13 (i.e., information relating to object display), and regeneration data Rg corresponding to the scene 120 composed of plural objects is output.

The decoding operation mentioned above is similar to that of the conventional object data decoding apparatus.

The object data decoding apparatus 101 according to this first embodiment is characterized by that the object table T1 shown in FIG. 2 is created by the CPU 13.

Figure 3:
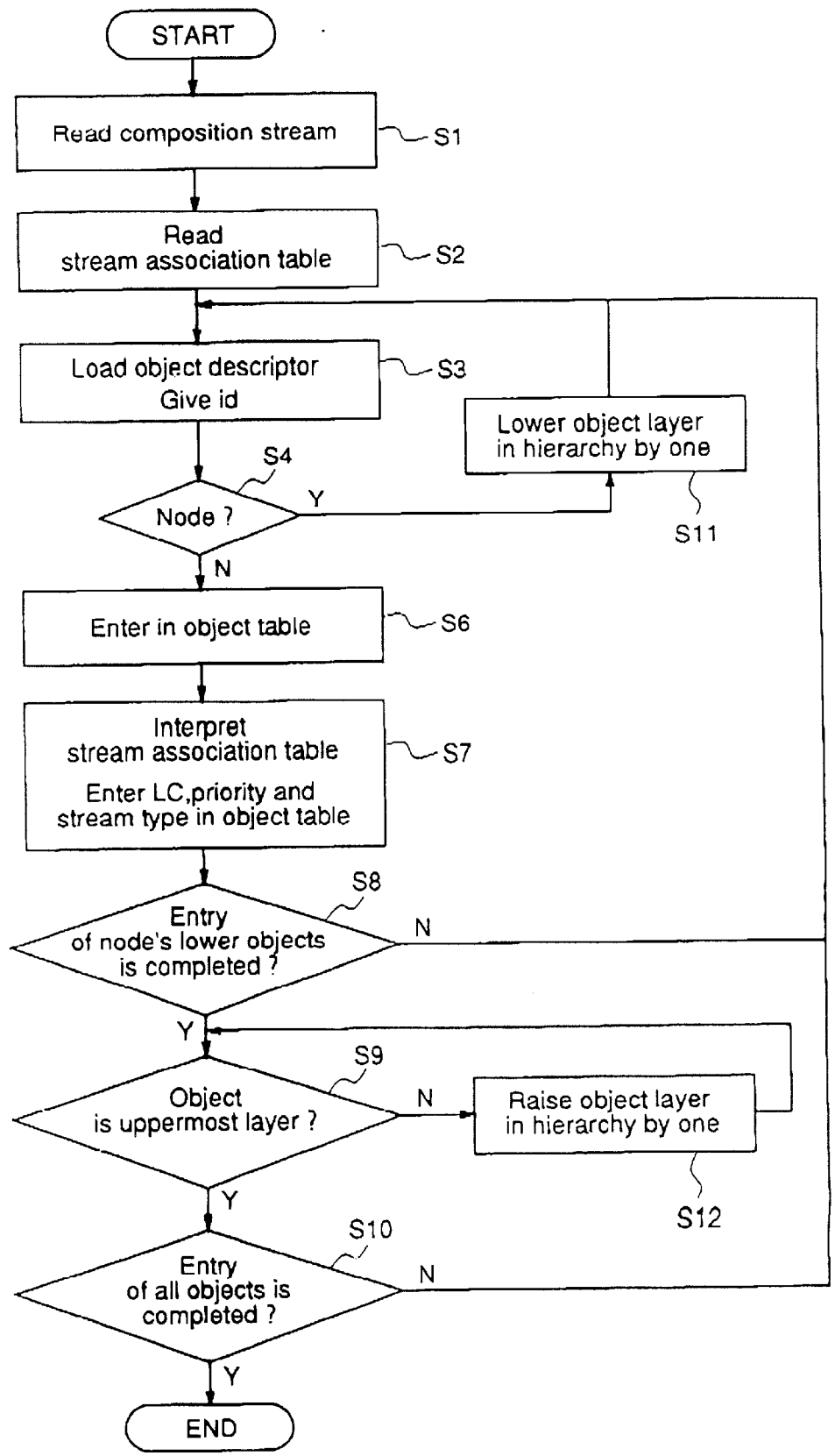
FIG. 3 is a flowchart for explaining process steps by a CPU in the object data decoding apparatus according to the first embodiment.

Hereinafter, a description is given of the object table creation process. FIG. 3 is a flowchart showing the algorithm for creating the object table T1 by the CPU 13.

Initially, in step S1, the composition stream is read into the data storage of the CPU 13. In step S2, the stream association table is read into the data storage of the CPU 13. In step S3, descriptors of the respective objects on the composition table are loaded into a processor of the CPU 13 wherein an object id value Oid is given to each descriptor, whereby each object can be identified by the object id.

In step S4, it is decided whether or not the object of which descriptor has been loaded corresponds to a node and has no stream. When it corresponds to a node and has no stream, in step S11, the layer of object of which descriptor is to be loaded is lowered by one, followed by step S3 wherein the descriptors of the lower objects being components of the object corresponding to the node are loaded into the CPU 13.

When it is decided in step S4 that the object of which descriptor has been loaded is not one corresponding to a node and having no stream, in step S6, the object id value Oid is entered as a component of the object table.

Thereafter, in step S7, stream association table is interpreted and, according to the result of the interpretation, various kinds of table components corresponding to each object are entered in the object table. The main table components are as follows: the logical channels (LC) corresponding to the respective objects, the priority order of the respective objects, the stream indices (id) corresponding to the respective objects, and the stream type (i.e., Video or Audio). Besides, the following table components are also entered: the indices of the upper and lower objects corresponding to the respective objects, the logical channels of the upper and lower objects, and the indices of objects which share their logical channels with other objects.

In step S8, it is decided whether entry of table components relating to objects that belong to the same node as an object currently being processed by the CPU 13 has been completed or not. When it has not been completed, the control of the CPU 13 returns to step S3, followed by steps S4 to S8. On the other hand, when it is decided in step S8 that entry of table components has been completed with respect to all the objects of the node to which the object currently being processed belongs, the CPU control proceeds to step S9 wherein it is decided whether or not the object currently being processed is the uppermost-layer object in the hierarchy.

When the object currently being processed is not the uppermost-layer object, a process of raising the object layer by one is carried out in seep S12, followed by the decision in step S9. On the other hand, when it is decided in step S9 that the object currently being processed is the uppermost-layer object, the CUP control proceeds to step S10 wherein it is decided whether entry of table components has been completed or not with respect to all the objects constituting one scene.

When it is decided that entry of table components of all the objects has not been completed yet, the CPU control returns to step S3, followed by steps S4 to S9, S11 and S12. On the other hand, when the decision in step 10 is that entry of table components of all the objects has been completed, the object table creation process by the CPU 13 is ended.

In the object data decoding apparatus 101 according to this first embodiment, the object table so created is stored in the data storage of the CPU 13. The stored object table will be updated at every updating of the composition stream and the stream association table so that it can correspond to the updated information. Accordingly, the object table is updated only when any of the objects constituting one scene is changed.

When the multiplexed bit stream includes a flag showing that the updated composition stream and stream association table are sent, the object table may be updated only when the flag is newly sent.

When the object data decoding apparatus 101 performs decoding to a specific object according to a request from the user, a logical channel LC corresponding to the specific object is specified on the basis of the object table stored in the data storage of the CPU 13, and only a packet having this logical channel LC is extracted from the multiplexed bit stream for decoding.

For example, when only the object 122 (Oid=2) corresponding to a node is subjected to decoding, in the multiplexed bit stream of the data structure according to the prior art, it is necessary to interpret the composition stream and the stream association table by the CPU and specify the logical channel LC corresponding to the object 122. In this first embodiment, however, since the object table shown in FIG. 2 is included in the multiplexed bit stream MEg, the logical channel LC corresponding to the object 122 (i.e., OLC=6~9) can be specified in a moment, resulting in high-speed retrieval.

Further, when the throughput of the decoding apparatus is low and it cannot decode all the objects, it is considered to decode only objects having high priorities. In this first embodiment, since the object table contains the priority order of the respective objects, it is easy to specify the logical channels of high-priority objects.

Furthermore, since the object table contains the indices of objects that share a logical channel with other objects, the following effect is expected.

That is, in the bit stream according to this embodiment, the objects 124 and 125 having Oid=4 and Oid=5 as their object ids (see FIG. 18) share coded data of the same logical channel LC (OLC=6). So, although these objects have different object id values and different stream id values, these objects have the same value (OLC=6) Or corresponding logical channel LC.

When coded data of a specific object is deleted from the multiplexed bit stream, according to the object id of an object relating to the specific object, a logical channel LC corresponding to the relevant object is decided and, thereafter, coded data of the specific object is extracted from the multiplexed bit stream. However, when the specific object shares its logical channel with the relevant object, if coded data of the specific object is deleted, coded data corresponding to the relevant object is gone, whereby decoding of the relevant object cannot be carried out.

In this first embodiment, since the object table T1 contains the index of object that shares its logical channel with another object, this index can be used for deciding whether coded data of the object can be deleted or not, whereby the above-mentioned problem is avoided.

As described above, in this first embodiment of the invention, on the basis of the multiplexed bit stream including coded data Eg corresponding to plural objects, the object data showing the correspondences between the respective objects and the coded data is created in advance and, using the object table, extraction, selection, or retrieval of a specific object is carried out. Therefore, as compared with the case where retrieval or the like of a specific object is carried out by interpreting information about the object included in the multiplexed bit stream each time, the processing quantity required for retrieval or the like is reduced, resulting in high-speed processing.

Further, on the object table T1, since the correlation of plural objects constituting one scene and having a hierarchical structure is described clearly, even when plural objects are included in one object, replacement and edition of the objects are facilitated.

Although in this first embodiment the objects that share a logical channel are shown by their object ids, flags such as "1" and "0" may be used to show only whether or not an object shares its logical channel with another object is required. In this case, the object table is simplified.

Further, the object table is not restricted to that shown in FIG. 2. Hereinafter, a description is given of an object data decoding apparatus which creates an object table different from the object table shown in FIG. 2, according to a modification of the first embodiment.

Figure 4:
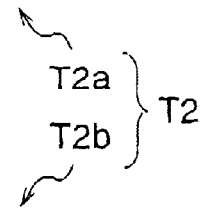
FIG. 4 is a diagram for explaining another object table created in the object data decoding apparatus according to the first embodiment, illustrating a table corresponding to upper-layer objects and a table corresponding to lower-layer objects.

FIG. 4 is a diagram for explaining an object table created by the decoding apparatus according to the modification, wherein a table corresponding to upper-layer objects and a table corresponding to lower-layer objects are illustrated.

The object table T2 shown in FIG. 4 is different from the object table T1 shown in FIG. 2 in that the table T2 does not have logical channels (LC) of the respective objects, and the table T2 is divided into two parts, i.e., an upper-layer table T2*a* and a lower-layer table T2*b*.

The process of creating the object table T2 is different from the process flow shown in FIG. 3 only in that the logical channels (LC) are not entered as table components. So, the object table T2 can be created according to a process flow similar to the process flow shown in FIG. 3.

By the way, as mentioned above, the bit stream is not always one in which coded data corresponding to the respective objects are multiplexed. In a bit stream in which coded data are not multiplexed, no stream association table is included. So, no logical channel LC is obtained from this bit stream.

In such a bit stream, the logical channels ii the multiplexed bit stream correspond to streams, so that coded data of each object is specified using the stream id instead of the logical channel LC.

Therefore, on the object table T2 shown in FIG. 4, like the object table T1 shown in FIG. 2, an object index (id) for identifying each object is entered to make the relationship between the object and the stream clear.

Further, on the object table T2 shown in FIG. 4, in order to make the object hierarchy clear, "H" is adopted as a code showing hierarchical information and described in the section of the kind of stream. With respect to the object having "H" in this section, the object table T2*b* (lower-layer table) corresponding to lower-layer objects included in this object is created.

As described above, since the object table has a hierarchical structure, even when the hierarchy of objects constituting one scene increases, the size of the object table for each layer (T2a or T2b), which is a component of the object table (T2), does not increase. Therefore, when performing edition or replacement to the upper-layer objects, only the upper-layer object table (T2a) of which size is reduced is retrieved, whereby detection of objects is facilitated.

Although in the first embodiment and its modification, object tables are obtained from the multiplexed bit stream shown in FIG. 3 and the non-multiplexed bit stream shown in FIG. 4, respectively, object tables are not restricted thereto.

For example, in order to make the object table shown in FIG. 2 compact, from the table components shown in FIG. 2, the upper object id, the upper object LC, the priority order, the kind of stream, and the common object id may be deleted.

To the contrary, although the size of the object table is somewhat increased, in order to simplify the operation such as edition or replacement of objects, the logical channel of the composition stream itself and the logical channel of the stream association table itself may be described on the object table, or header information of streams corresponding to video and audio objects may be added to the table.

As described above, the object table created by the object data decoding apparatus according to the present invention may have any structure as long as, on the table, the respective objects are correlated with the stream indices or logical channels of the objects.

Furthermore, in the object coding method, there is a case where the multiplexing relationship is expressed by only the stream association table in the bit stream without including the composition stream in the bit stream, in order to simplify the structure of the decoding apparatus.

In this case, although the object-to-stream correspondence is not uniquely defined, an object table excluding some of table components of the object table T1 shown in FIG. 2, such as the object id, the stream id, the kind of stream, the priority order, and the common object id, may be created from the stream association table. In this case, the hierarchical relationship of the logical channels corresponding to coded data of the respective objects is clearly defined. Further, an object table excluding some of table components of the object table T2 shown in FIG. 4, such as the object id, the stream id, the kind of stream, and the priority order, may be created from the stream association table.

[Embodiment 2]

Figure 5:
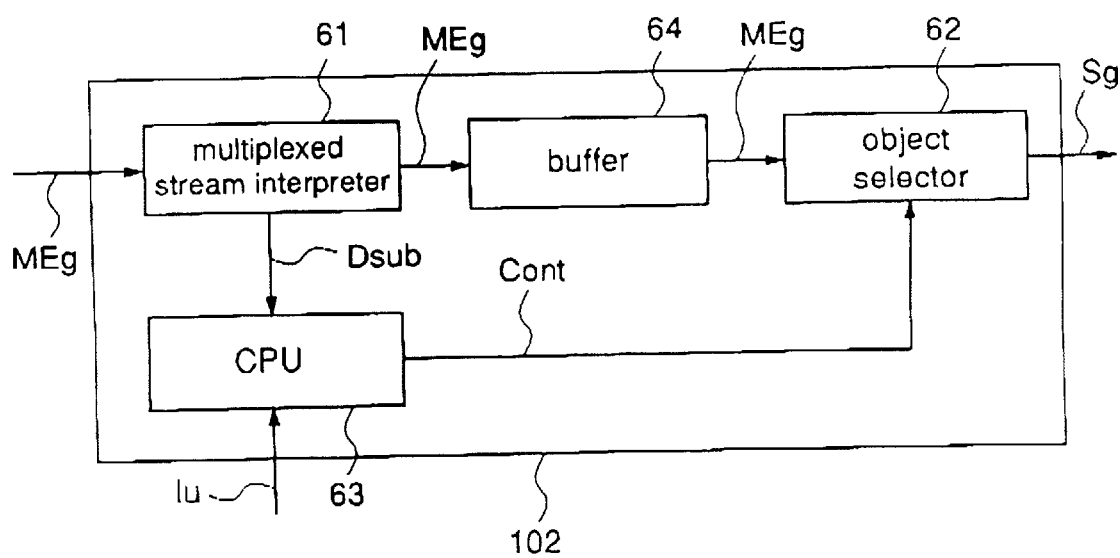
FIG. 5 is a block diagram for explaining an object data selecting apparatus as an object data processing apparatus according to a second embodiment of the present invention.

FIG. 5 is a block diagram for explaining an object data selecting apparatus as an object data processing apparatus according to a second embodiment of the present invention.

In FIG. 5, an object data selecting apparatus 102 according to this second embodiment selects and extracts coded data Sg of a specific object from a multiplexed bit stream MEg, according to an instruction signal Iu corresponding to user's instruction. The multiplexed bit stream MEg is identical to that shown in FIG. 19 wherein coded data of plural objects are multiplexed in units of the objects.

The object data selecting apparatus 102 includes a multiplexed stream interpreter 61, an object selector 62, and a buffer 64. The multiplexed stream interpreter 61 detects a composition stream and a stream association table which are auxiliary data Dsub included in the multiplexed bit stream MEg. The object selector 62 selects and extracts coded data corresponding to a specific object from the multiplexed bit stream MEg according to a control signal Cont. The buffer 64 is disposed between the multiplexed stream interpreter 61 and the object selector 62, and retains the multiplexed bit stream for a prescribed period of time.

Further, the selecting apparatus 102 includes a CPU 63. The CPU 63 creates the object table T1 shown in FIG. 2 on the basis of the composition stream and the stream association table, and outputs a signal for selecting coded data of a specified object (control signal Cont) toward the object selector 62 according to an object specifying signal Iu generated as a result of user's operation. Since coded data of the specific object is extracted from the multiplexed bit stream MEg, the contents described in the composition stream and the stream association table change. So, the CPU 63 rewrites the auxiliary data relating to the composition stream and the stream association table so that the stream and the table correspond to the extracted object, and outputs the data to the object selector 62. the object selector 62 adds the composition stream and the stream association table, which have been rewritten by the CPU 13, to the coded data of the extracted object when outputting the coded data.

Figure 6:
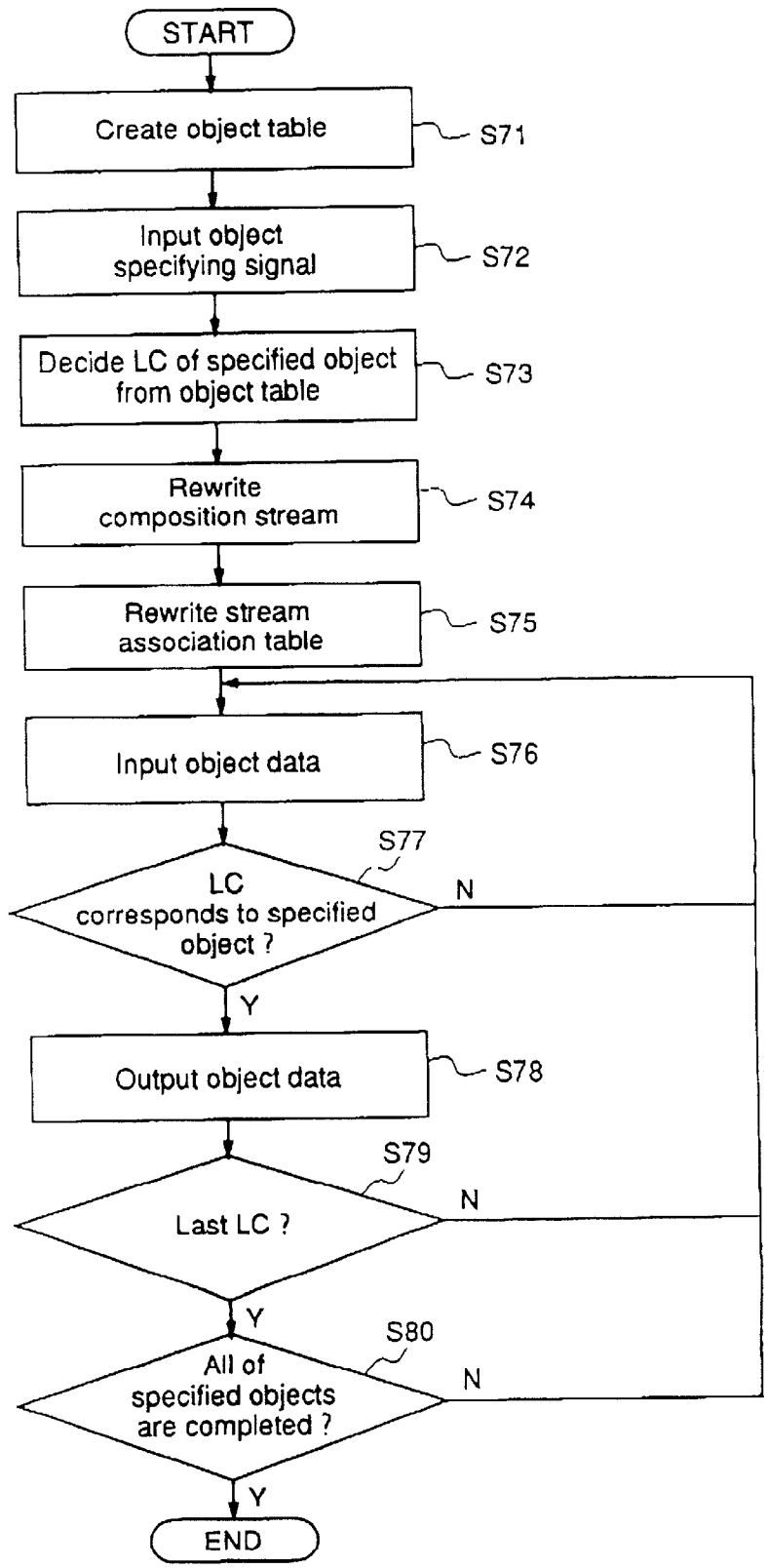
FIG. 6 is a flowchart for explaining process steps by a CPU in the object data selecting apparatus according to the second embodiment.

A description is given of the operation of the object data selecting apparatus 102 using a flowchart shown in FIG. 6.

Initially, in step S71, the object table T1 is created according to the multiplexed bit stream MEg input to the object data selecting apparatus 102.

To be specific, the multiplexed bit stream is interpreted by the multiplexed stream interpreter 61, and the composition stream and the stream association table which are auxiliary data Dsub included in the multiplexed bit stream MEg are detected and supplied to the CPU 63. In the CPU 63, the object table T1 is created according to the auxiliary data Dsub and stored in the data storage. The process of creating the object table T1 is identical to that already described for the first embodiment.

When a signal Iu specifying an object is input by the user or the like (step 372), the CPU 63 retrieves the object table according to the object specifying signal Iu, specifies the logical channel LC of the specified object, and sends the logical channel LC to the object selector 62 as the control signal cont (step S73).

Subsequently, the CPU 63 rewrites the composition stream (step S74) and rewrites the stream association table (step S75) so that the stream and the table correspond to coded data of the specified object.

To rewrite the composition stream and the stream association table is necessary because the correlation of objects included in the multiplexed bit stream changes between the input multiplexed bit stream and the multiplexed bit stream corresponding to the extracted object. While the rewriting is carried out, the multiplexed bit stream output from the multiplexed stream interpreter 61 is stored in the buffer 64.

When coded data corresponding to each object included in the multiplexed hit stream is input through the buffer 64 to the object selector 62 (step S76), the object selector 62 decides whether the input coded data corresponds to the logical channel LC of the specified object or not, according to the control signal Cont corresponding to the object specifying signal from the CPU 63 (step S77).

As the result of this decision, when the input coded data does not correspond to the specified object, the next coded data is input to the object selector 62 (step S76). On the other hand, when the input coded corresponds to the specified object, the coded data is output as coded data corresponding to the specified object (step S78). The object selector 62 outputs the coded data of the selected object together with the rewritten composition stream and stream association table.

Thereafter, the object selector 62 decides whether or not the output coded data is the last coded data of the specified object. As the result of this decision, when the output coded data is not the last one, above-mentioned Steps S76~S79 are repeated. On the other hand, when the output coded data is the last one, it is decided whether output of coded data of all the specified objects is completed or not (step 380). When it is not completed yet, above-mentioned steps S76~S80 are repeated. On the other hand, when it is completed, the process of selecting coded data of specified objects is ended.

When the object selector 62 outputs coded data of a specified object as described above, the transfer rate of the multiplexed bit stream output from the object data selecting apparatus 102 is lowered as compared with the transfer rate of the multiplexed bit stream input to this apparatus. So, the object selector 62 can change the transfer rate as desired. However, the transfer rate may be changed by independent means located on the output side of the selector 62.

As described above, according to the second embodiment of the invention, on the basis of a bit stream in which coded data Eg corresponding to plural objects are multiplexed, an object table on which the respective objects are correlated with the coded data thereof is created in advance. Using the object table, coded data corresponding to a specific object is extracted from the bit stream. Therefore, it is possible to extract or delete coded data of a specific object from the multiplexed bit stream at high speed in the middle of a transmission path or the like.

Although in this second embodiment a specific object extracted is transmitted, a specific object extracted may be deleted to transmit the rest of the stream.

[Embodiment 3]

Figure 7:
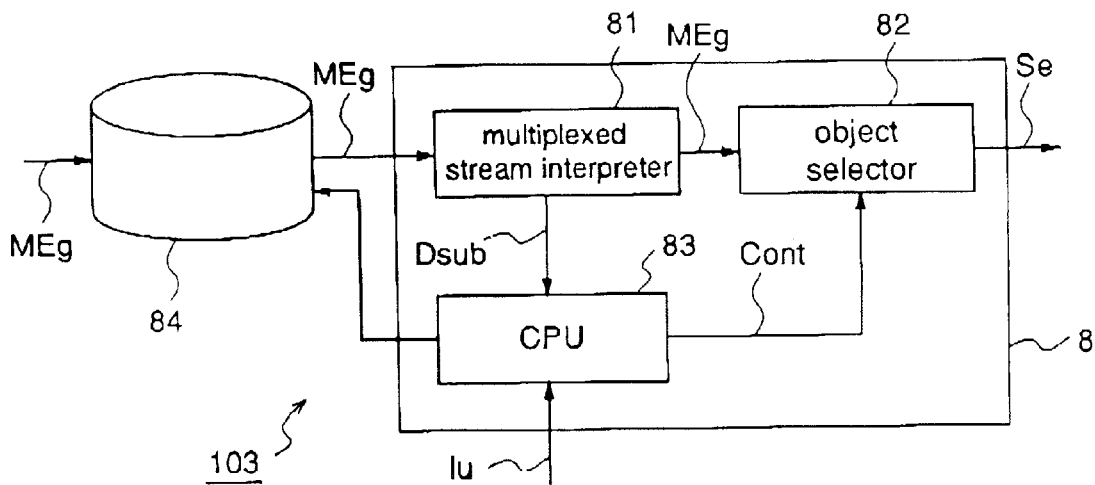
FIG. 7 is a block diagram for explaining an object data recording apparatus according to a third embodiment of the present invention.

FIG. 7 is a block diagram for explaining an object data recording apparatus according to a second embodiment of the present invention.

In FIG. 7, an object data recording apparatus 103 includes a data storage 84, and an object data selecting unit 8 that selects and extracts data stored in the data storage 84. The recording apparatus 103 records the multiplexed bit stream MEg in the data storage 84, and retrieves or outputs coded data of a specified object from the stream stored in the data storage 84 according to user's instruction or the like.

The object data selecting unit 8 includes a multiplexed stream interpreter 81 and an object selector 82. The multiplexed stream interpreter 81 detects a composition stream and a stream association table which are auxiliary data Dsub included in the multiplexed bit stream MEg. The object selector 82 selects and extracts coded data corresponding to a specific object from the multiplexed bit stream MEg according to a control signal Cont.

Further, the object data selecting unit 8 includes a CPU 83. The CPU 83 creates the object table T1 shown in FIG. 2 on the basis of the composition stream and the stream association table, and records the object cable in a prescribed region of the data storage 84, for example, a region where management information showing the contents of the storage 84 is recorded, or a region where object tables are managed collectively. The object table may be recorded in the same region as where the multiplexed bit stream MEg is stored so that the table is positioned at the head of the stream MEg.

Further, the CPU 83 outputs a signal for selecting coded data of a specified object (control signal Cont) toward the object selector 82 according to an object specifying signal Iu generated as a result of user's operation. Furthermore, the CPU 83 rewrites the auxiliary data relating to the composition stream and the stream association table so that the stream and the table correspond to the selected object, and adds the rewritten data to the coded data of the selected object when the coded date is output.

A description is given of the operation of the object data recording apparatus 103.

Figure 8:
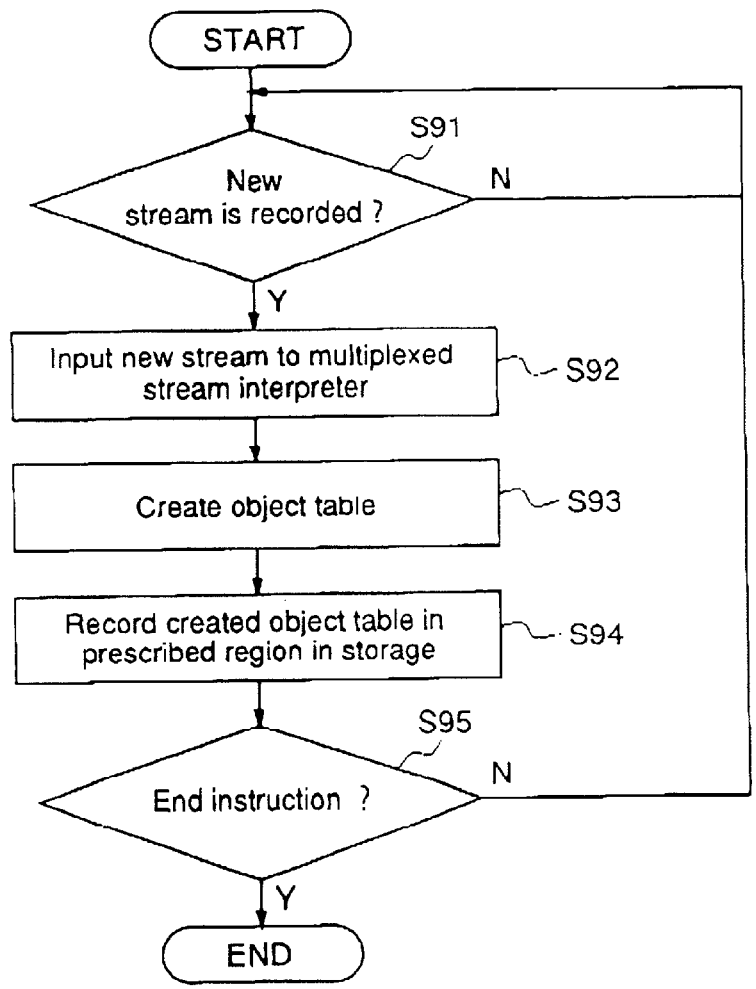
FIG. 8 is a flowchart for explaining process steps by a CPU in the object data recording apparatus according to the third embodiment.

FIG. 8 is a flowchart showing process steps of creating the object table.

When the multiplexed bit stream MEg is input to the object data recording apparatus 103 and stored in the data storage 84 (step S91), an object table corresponding to the multiplexed bit stream is created in the object data selecting unit 8 controlled by the CPU 83.

More specifically, the multiplexed bit stream is input to the multiplexed stream interpreter 81 (step S92), and the composition stream and the stream association table which are auxiliary data Dsub included in the multiplexed bit stream MEg are detected by the interpreter 81 and supplied to the CPU 83. In the CPU 83, an object table (refer to FIG. 2) is created according to the auxiliary data Dsub (step S93). The object table created by the CPU 83 is stored in the data storage 84 (step S94). Thereafter, it is decided whether an instruction to end the process of selecting object data is input or not. When there is no end instruction, above-mentioned steps S91~S95 are repeated. When the end instruction is input, the object data selecting process is ended.

The object table is stored in a prescribed region of the data storage 84, for example, a region where management information showing the contents of the storage 84 is recorded, a region where object tables are managed collectively, or the same region as where the multiplexed bit stream MEg is stored (in this case, the table is stored at the head of the stream).

When a signal specifying an object is input to the recording apparatus 103, in the CPU 83, the object table stored in the data storage 84 is retrieved, a logical channel LC corresponding to the specified object is specified, and the specified logical channel LC is output to the object selector 82.

In the object selector 82, on the basis of the logical channel LC from the CPU 83, coded data corresponding to the specified logical channel is selected from the multiplexed bit stream, and the selected coded data Se is output. When the composition stream and the stream association table are changed due to the object selection, the CPU 83 rewrites the stream and the table. The rewritten stream and table are input to the object selector 82 wherein the rewritten stream and table are added to the selected object to be output.

As described above, according to the third embodiment of the present invention, in an apparatus for recording a multiplexed bit stream including coded data of plural objects constituting a single image, an object table on which the respective objects are related with the coded data thereof is created on the basis of the multiplexed bit stream, and the coded data and the object table corresponding to the coded data are recorded. Therefore, the recorded multiplexed bit stream is collectively managed by the object table, whereby the process of retrieving and outputting a desired object from the recorded multiplexed bit stream is performed at high speed.

In the object data recording apparatus 103, since the data storage 84 can serve as a buffer, no buffer is disposed between the multiplexed stream interpreter 81 and the object selector 82. However, a buffer as shown in FIG. 5 may be disposed between the interpreter 81 and the selector 82.

[Embodiment 4]

Figure 9:
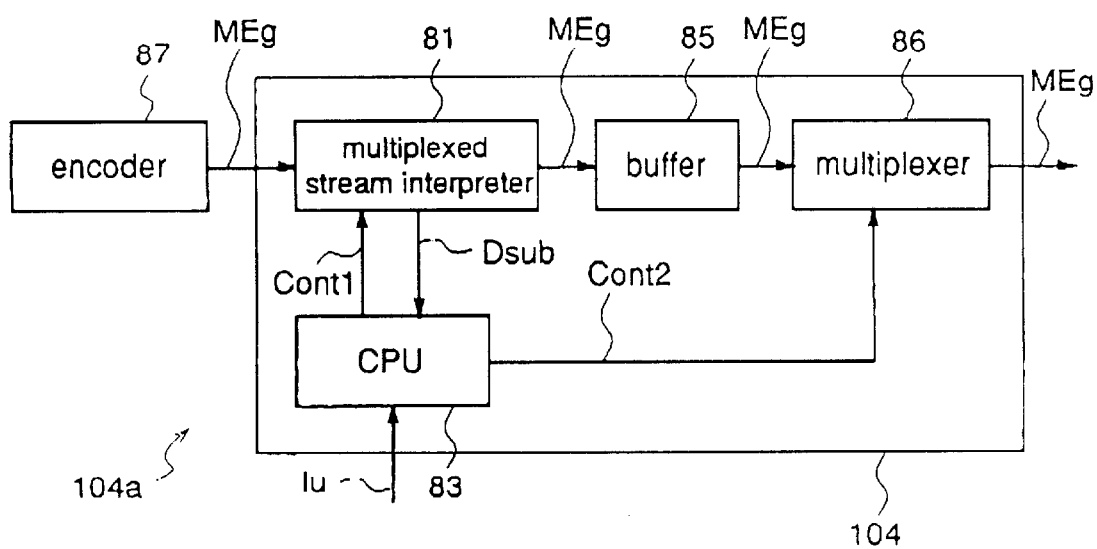
FIG. 9 is a block diagram for explaining an object data outputting apparatus as an object data processing apparatus according to a fourth embodiment of the present invention.

FIG. 9 is d block diagram illustrating an object data multiplex coding apparatus 104a including an object data output unit 104 which is an object data processing apparatus according to a fourth embodiment of the present invention.

The object data multiplex coding apparatus 104a comprises an encoder 87 and the object data output unit 104. The encoder 87 generates coded data corresponding to plural objects constituting one scene by coding data of the respective objects, multiplexes these coded data with a composition stream and a stream association table which are auxiliary data Dsub, and output the multiplexed data. The object data output unit, 104 adds an object table on which the respective objects are correlated with coded data of the objects to the multiplexed bit stream MEg output from the encoder 87, and outputs the multiplexed bit stream MEg with the object table.

The object data output unit 104 includes a multiplexed stream interpreter 81 which detects the composition stream and the stream association table which are auxiliary data Dsub included in the multiplexed bit stream MEg according to a control signal Cont1, and a buffer 85 which temporarily stores the multiplexed bit stream MEg that is input to the buffer 85 through the multiplexed stream interpreter 81. Further, the output unit 104 includes a CPU 83 which forms an object table T1 as shown in FIG. 2 on the basis of the composition stream and the stream association table, and a multiplexer 86 which adds the object table to the multiplexed bit stream output from the buffer 85 according to a control signal Cont2.

Figure 10:
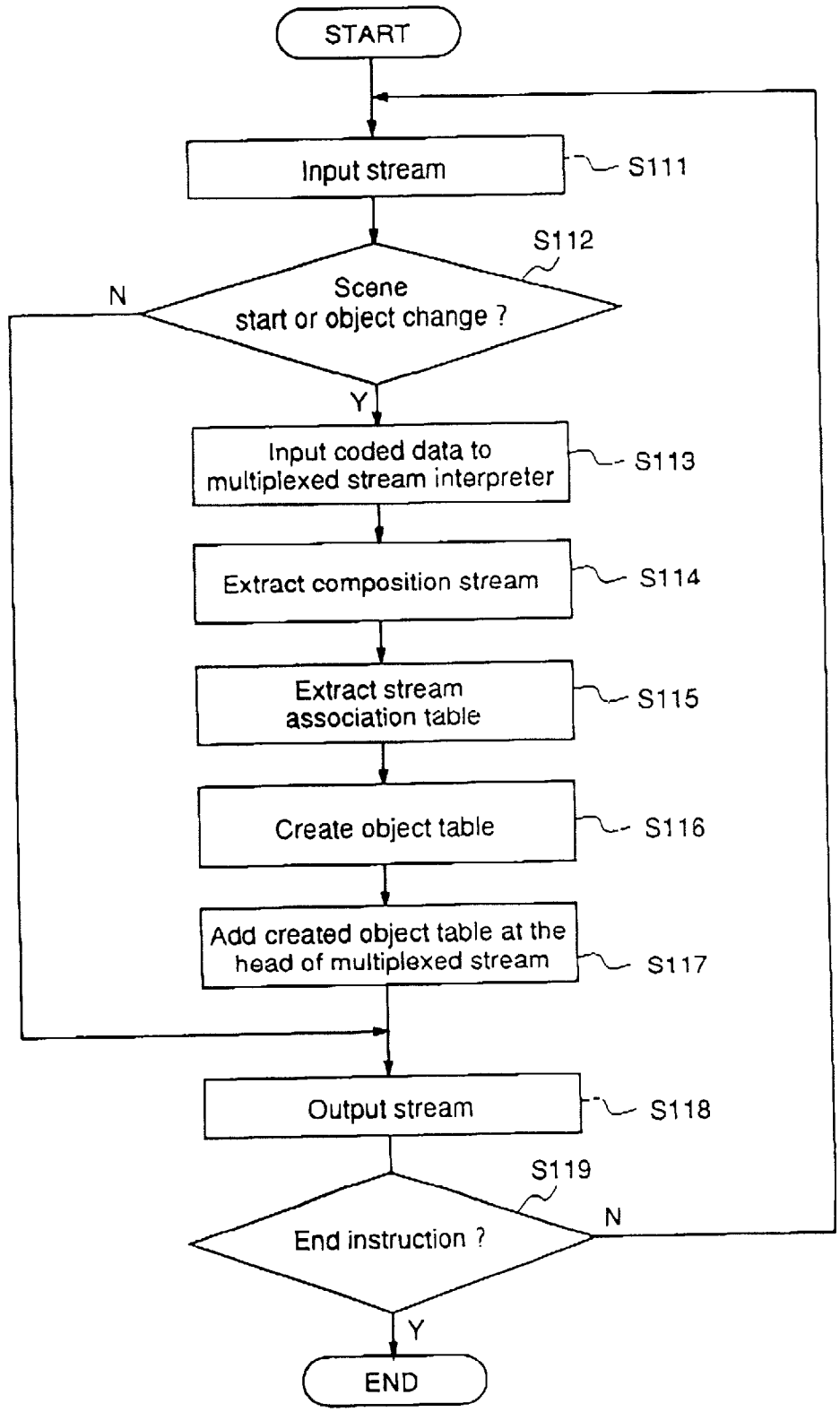
FIG. 10 is a flowchart for explaining process steps by a CPU in the object data outputting apparatus according to the fourth embodiment.

The operation of the object data output unit 104 will be described using a flowchart shown in FIG. 10.

When the multiplexed bit stream generated by compressive multiplexing in the encoder 87 is input to the object data output Unit 104 (step S111), the CPU 83 decides whether it is "start of scene" or "change of objects constituting one scene" (step S112). When the decision is neither of "start" and "change", the multiplexer 86 is controlled by the control signal Cont1 so that the input multiplexed bit stream is output as it is.

On the other hand, when it is "start of scene" or "change of objects constituting one scene", the multiplexed stream interpreter 81 is controlled by the control signal Cont1 so that the multiplexed bit stream MEg is input to the multiplexed stream interpreter 81 and processed (step S113). In the CPU 83, the composition stream is detected from the multiplexed bit stream (step S114) and, subsequently, the stream association table is extracted from the multiplexed bit stream (step S115) and, further, an object table is created on the basis of the composition stream and the stream association table (step S116).

Thereafter, in the CPU 83, at the time of scene start or scene change, the created object table is added at the head of the multiplexed bit stream output from the buffer 85 (step S117), and the multiplexed bit stream with the object table is output (step S118).

Thereafter, it is decided whether an instruction to end the process of outputting the multiplexed bit stream from the encoder 87 is input or not (step S119). When there is the end instruction, the output process is ended. When there is no end instruction, above-mentioned steps S111 to S119 are repeated.

As described above, according to the fourth embodiment of the invention, the object data output unit 104 receives a multiplexed bit stream obtained by multiplexing coded data of plural objects constituting one scene, adds an object table on which the respective objects are correlated with their coded data to the multiplexed bit stream, and outputs the multiplexed bit stream with the object table. Therefore, it is not necessary for an object data decoding apparatus receiving the multiplexed bit stream MEg with the object table to create an object table, whereby an object data decoding apparatus providing the same effects as the decoding apparatus according to the first embodiment can be realized with simplified structure.

Employed as an object data decoding apparatus to which the multiplexed bit stream MEg and the object table are input may be either a decoding apparatus in which the object table and the coded data of the respective objects in the multiplexed bit stream MEg are stored in different storage regions or a decoding apparatus in which the object table and the coded data are stored in the same storage region.

While in this fourth embodiment the object data output unit 104 outputs the multiplexed bit stream after adding the object table at the head of the stream, the structure of the output unit is not restricted thereto. For example, according to the application, the object table may be inserted in the middle of the multiplexed bit stream and, in this case, the capacity of the bluffer 85 can be decreased.

Further, in this fourth embodiment, the encoder 87 Simply generates coded data corresponding to the respective objects, and the output unit 104 receives the multiplexed bit stream generated by the encoder and outputs the multiplexed bit stream after adding the object table to the stream. However, the structures of the encoder and the output unit are nut restricted thereto. For example, the encoder may create the object table simultaneously with formation of the composition stream and the stream association table, and add the object table to the multiplexed bit stream separately from the composition stream and the stream association table when outputting the multiplexed bit stream. Or, the object table may be output as a part of the composition stream. In this case, the multiple stream interpreter 81 in the output unit is dispensed with, and a conventional multiplexer can be used in the output unit.

Although in the second to fourth embodiments a multiplexed bit stream is described as input coded data, these embodiments are not restricted thereto.

For example, an input bit stream may be a bit stream in which coded data are partitioned in units of objects as described for the modification of the first embodiment. Also in this case, the same effects are obtained by creating the object table as shown in FIG. 4.

Especially, even when the object data output unit 104 according to the fourth embodiment is constructed so that it receives such a non-multiplexed bit stream and creates the object table shown in FIG. 4, employed as an object data decoding apparatus which receives the multiplexed bit stream MEg with the object table output from the output unit may be either a decoding apparatus in which the object table and the coded data of the respective objects in the multiplexed bit stream MEg are stored in different storage regions or a decoding apparatus in which the object table and the coded data are stored in the same storage region.

Furthermore, although in the first to fourth embodiments a multiplexed bit stream including coded data corresponding to video data and audio data is described, any multiplexed bit stream may be employed as long as it includes coded data of plural objects constituting individual information to be recorded or transmitted. For example, the respective embodiments may employ a multiplexed bit data including, as coded data of objects, only coded data of video data, audio data, or computer data, or a multiplexed bit data including coded data of other data.

Furthermore, in the first to fourth embodiments, the object table is created on the basis of the composition table and the steam association table which are included in the multiplexed bit stream MEg as auxiliary data. However, in an information transmission system corresponding to MPEG4 which is currently being standardized, the format of scene description is different from that according to the composition table, and an object descriptor showing the correspondence between object id and stream id is employed in place of the stream association table showing the correspondence between stream id and logical channel.

A description is now given of an object data transmission system according to MPEG4.

Figure 11:
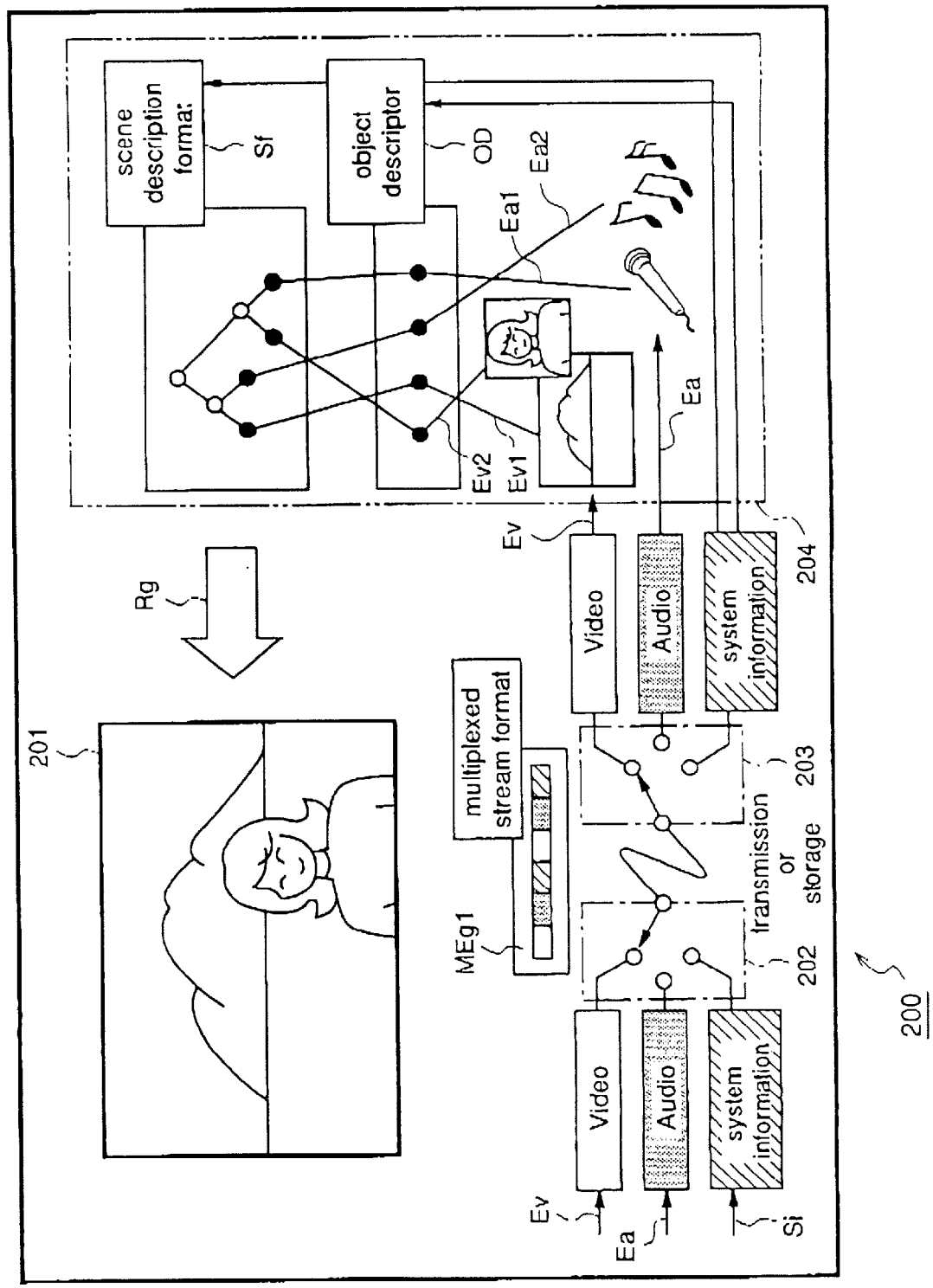
FIG. 11 is a diagram for explaining an object data decoding apparatus based on MPEG4 as an object data processing apparatus according to a fifth embodiment of the invention, illustrating the outline of a data transmission system based on MPEG4.

FIG. 11 is a diagram illustrating the structure of the object data transmission system 200.

In this system 200, coded video data Ev and coded audio data Ea corresponding to objects constituting a single scene 201 and system information Si as auxiliary data are multiplexed by a multiplexer 202, and a multiplexed bit stream MEg1 obtained as a result of the multiplication is transmitted through a transmission medium or stored in a storage medium.

The multiplexed bit stream MEg1 transmitted through the transmission medium or read from the storage medium is demultiplexed (divided) into the coded data Ev and Ea, and the system information Si by a demultiplexer 203.

To be specific, the scene 201 is composed of a background object OB1 (scenery), a sound object OB4 attendant on the background object OB1, a foreground object OB2 (person), and a voice object OB3 attendant on the foreground object OB2. The coded video data Ev is divided into coded data Ev1 corresponding to the background object OB1 and coded data Ev2 corresponding to the foreground object OB2. The coded audio data Ea is divided into coded data Ea1 corresponding to the voice object OB3 and coded data Ea2 corresponding to the sound object OB4. The system information Si as auxiliary data is divided into scene description information Sf and object descriptor OD.

Receiving the respective data separated from the multiplexed bit stream MEg1, a decoder 204 generates regeneration data Rg corresponding to the scene 201 according to these data.

That is, in the scene description information Sf, the hierarchical structure of the objects OB1~OB4 is described together with the relationship between the objects in each layer and their object indices. In the object descriptor OD, the relationship between the object indices and the stream indices (i.e., coded data corresponding to the objects) are described Accordingly, the decoder 204 performs decoding and composition of coded data of the respective objects on the basis of the scene description information Sf and the object descriptor OD, and generates a regeneration data Rg for displaying the scene 201.

Furthermore, in the system 200 in FIG. 11, the objects and the object descriptors are defined with the video data being distinguished from the audio data.

[Embodiment 5]

An object data decoding apparatus of a fifth embodiment of the present invention in the object data transmission system 20 will now be described.

Figure 12:
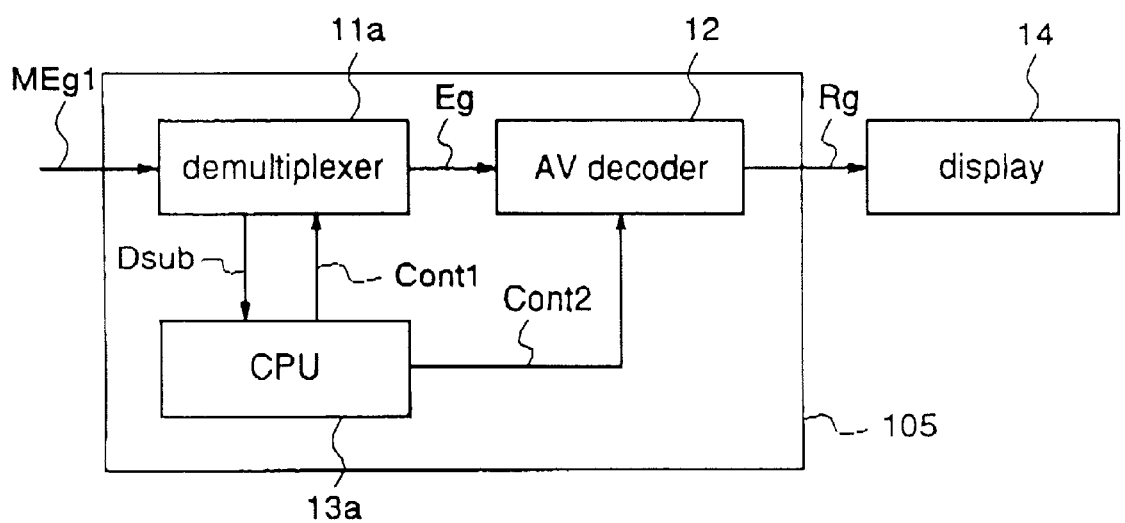
FIG. 12 is a block diagram for explaining an object data decoding apparatus as an object data processing apparatus according to the fifth embodiment of the invention.

FIG. 12 is a block diagram showing the object data decoding apparatus of the fifth embodiment. Note that the objects and the object descriptors are defined without distinguishing the video data from the audio data in this embodiment.

Referring to FIG. 12, an object data decoding apparatus 105 is shown. The object data decoding apparatus 105 is used for receiving a multiplexed bit stream MEg1 comprising a scene description information Sf and an object descriptor OD rather than the composition stream and the stream association table as the auxiliary data, and reproducing video data Rg of one scene from the multiplexed bit stream MEg1.

Figure 13:
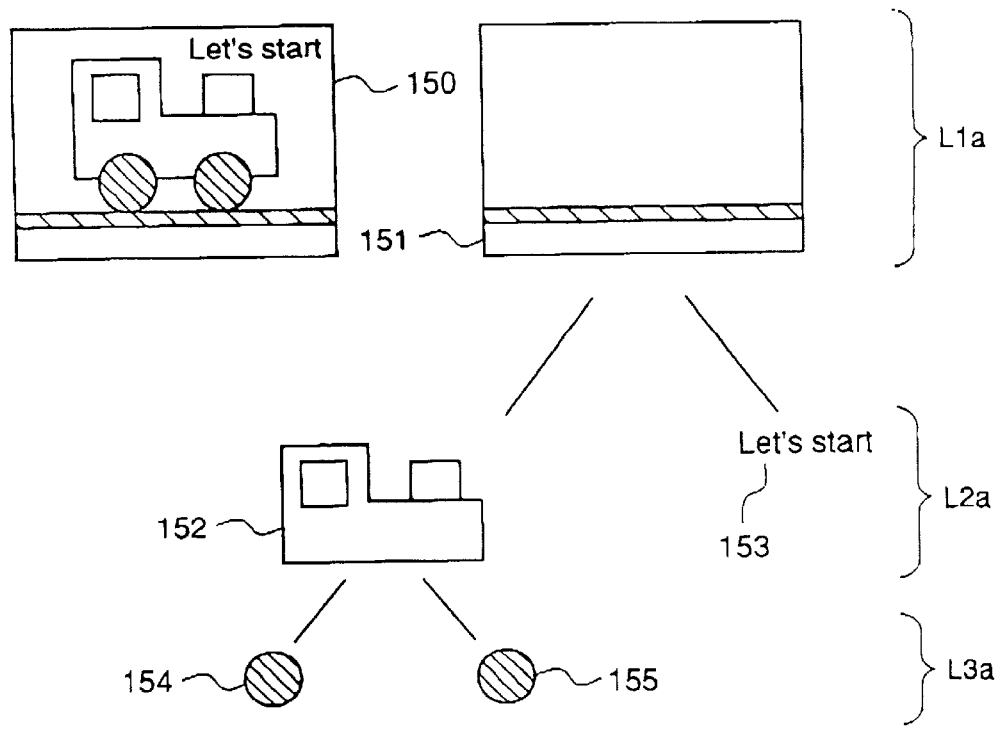
FIGS. 13(a) and 13(b) are schematic diagrams for explaining an object coding method corresponding to the data transmission system shown in FIG. 11.
Figure 13:
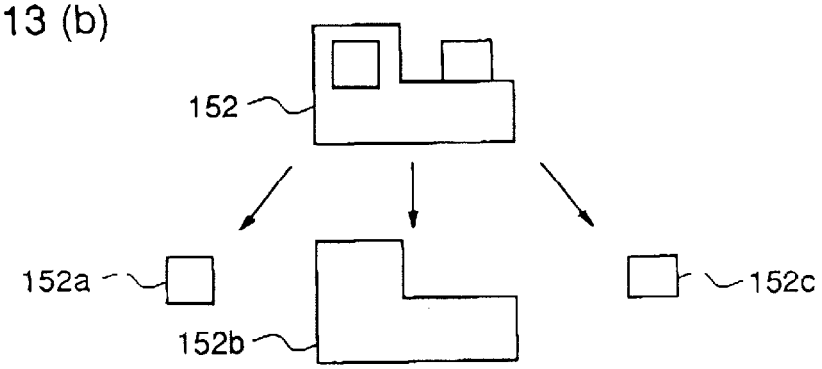

The multiplexed bit stream MEg1 comprises coded data in which scene data of one scene 150 in FIG. 13(a) has been coded for each object of the scene, and the auxiliary data.

Referring to FIGS. 13(a) and 13(b), the scene 150 comprises plural objects (small images) of a hierarchical structure. More specifically, the scene 150 comprises d background image 151 as a background, a mobile 152 moving in the background, logo (Let's start) 153 displayed on the background image, and first and second wheels 154 and 155, which correspond to the objects. The background image 151 serves AR a node, and the mobile 152 and the logo 153 belong thereto. Also, the mobile 152 serves as a node, and the first and second wheels 154 and 155 belong thereto. Coded data of the mobile 152 comprises coded data of a window 152a, a body 152b, and a chimney 152c.

Figure 14:
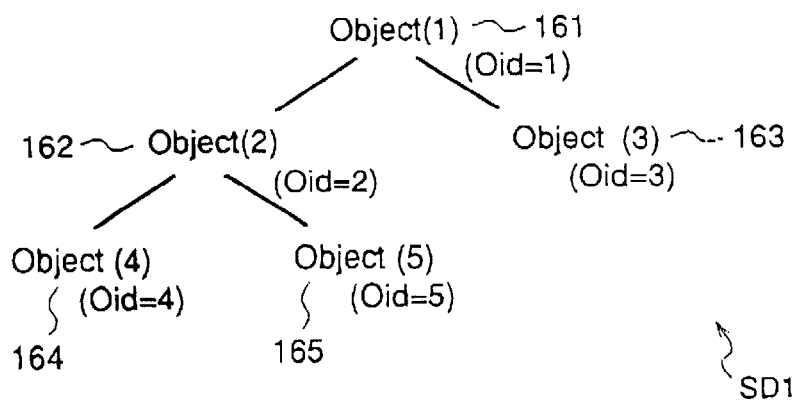
FIG. 14(a) is a diagram showing a scene description.
FIG. 14(b) is a diagram showing object descriptors, respectively, used in the data transmission system.

The auxiliary data of the multiplexed bit stream MEg1 comprises the scene description information and the object descriptor. FIG. 14(a) shows a scene description SD1 on the basis of the scene description information.

The scene description SDI describes the scene 150. In FIG. 14(a), Object(1) 161 to Object(5) 165 are shown, which are descriptors which indicate the background image 151, the mobile 152, the logo 153, and the first and second wheels 154 and 155, respectively. As is seen from these descriptors, the mobile 152 and the logo 153 belong to the background image 153, and the first and second wheels 154 and 155 belong to the mobile 152, To each of the descriptors 161 to 165, Object id (Oid) by which coded data of respective objects of the multiplexed bit stream MEg1 can be identified is given ("id" indicates index). Specifically, to the descriptors 161 to 165, Object id (iid) 1 to 5 are given, respectively.

Furthermore, in an object descriptor OD shown in FIG. 14(b), correspondence between Object id and Stream id is shown. As shown in FIG. 14(b), Object id (Oid=1), Object id (Oid=2), Object id (Oid=3), and Object id (Oid=4, 5), correspond to Stream id (Sid-1, 2), Stream id (Sid=3 to 6), Stream id (Sid=7), and Stream id (Sid=8), respectively.

Furthermore, in the object descriptor OD, data type of each object, i.e., "Video" or "Audio" is described.

The object data decoding apparatus 105 of the fifth embodiment will be described hereinafter.

Referring to FIG. 12 again, a basic construction of the object data decoding apparatus 105 is identical to that of the object data decoding apparatus 101 of the first embodiment. Specifically, the decoding apparatus 105 comprises a demultiplexer 11a for extracting the scene description information Sf and the object descriptor OD as auxiliary data Dsub included in the multiplexed bit stream MEg1, and extracting coded data Eg of each object from the multiplexed bit stream MEg1 in accordance with a first control signal Cont1, an audio and video (AV) decoder 12 for decoding the coded data Eg in accordance with a second control signal Cont2 and outputting reproduced data Rg of each scene, and a CPU 13a for deciding a stream id of the coded data Eg on the basis of the object descriptor OD and supplying the demultiplexer 11a with the first control signal Cont1 on the basis of the decision result, and supplying the AV decoder 12 with information on placement of objects of one scene and information on display start time of each object using the control signal Cont2 on the basis of the scene description information Sf.

In this fifth embodiment, the CPU is used to create an object table indicating correspondence between objects and the corresponding coded data Eg (stream) on the basis of the scene description information Sf and the object descriptor OD, to be stored in a data storage means in the CPU 13a.

FIGS. 15(a) and 15(b) are diagrams showing an object table T3 of the scene 150.

Referring to these figures, the object table T3 has a hierarchical structure, and comprises a main table T3a indicating a correspondence between objects of the scene 150 and the corresponding streams, and a sub table T3b indicating d correspondence between video or audio of each object and the corresponding stream.

In these tables, various information associated with Object id is entered.

Specifically, the Object id is given to each object descriptor in the scene description in FIG. 14(a) to have a one-to-one correspondence, and entered in ascending order of value "Oid" of the Object id.

Object indices (Oid=1–5) are given to the descriptors 161 to 165 of objects 151 to 151, respectively.

In the main table T3a, type or each object (video or audio), end the corresponding stream id are entered. In the main table T3a, indices of upper and lower objects of each object, stream indices of the upper and lower objects, common object indices of objects which share a stream, and priorities of respective objects are also entered.

The upper object is in a higher-order layer than an object, and the lower object is in a lower-order layer than the object.

Specifically, since no upper object of an upper most object, i.e., the object in a first layer L1a in FIG. 13(a) exists, Oid of the corresponding upper object id and Sid of the corresponding upper stream id are respectively "0". Upper objects of objects in second and third layers L2a and L3a are objects in the first and second layers L1a and L2a, respectively. In case of a lower most object, i.e., an object having no lower object, Oid of the corresponding lower object id and Sid of the corresponding lower stream id are respectively "0".

In case of objects 151 and 152 each comprising plural pieces of video and audio, the corresponding stream types "H" are described in the main table T3a, and stream indices of coded data of video and audio of these objects are described in the sub table T3b.

As can be seen from the object table T3, an object having Oid=1 comprises two objects, since Oid of the corresponding lower object id "2, 3" is described, and an object having Oid=2 comprises two objects, since Oid of the corresponding lower object id "4, 5" is described.

Subsequently, operation of the object data decoding apparatus 105 of the fifth embodiment will now be described.

Referring to FIG. 12 again, when the multiplexed bit stream MEg1 is input to the object data decoding apparatus 105, the demultiplexer 11a extracts the scene description information SDI and the object descriptor OD as the auxiliary data Dsub from the multiplexed bit stream MEg1 and outputs the Dsub to the CPU 13a.

The CPU 13a recognizes a correspondence between objects of the scene 150 in FIG. 13(a) and the corresponding stream indices on the basis of the object descriptor OD, and outputs the first control signal Cont1 on the basis of the result to the demultiplexer 11a.

The demultiplexer 11a collects plural paketed streams in the multiplexed bit stream for each object and outputs the resulting stream to the AV decoder 12.

At this time, the CPU 13a extracts information on a display position and display start time of each object from the scene description information SDI and outputs the information to the AV decoder 12 as the second control signal Cont2.

The AV decoder 12 decodes streams of respective objects (a series of coded data Eg) from the demultiplexer 11a, synthesizes decoded data of respective objects in accordance with the second control signal Cont2, and outputs reproduced data Rg of one scene comprising plural objects.

This decoding is identical to that of the prior art object decoding apparatus as already described.

In this fifth embodiment, in addition to the decoding, the CPU 13a creates the object table T3 in FIGS. 15(a) and 15(b).

Figure 16:
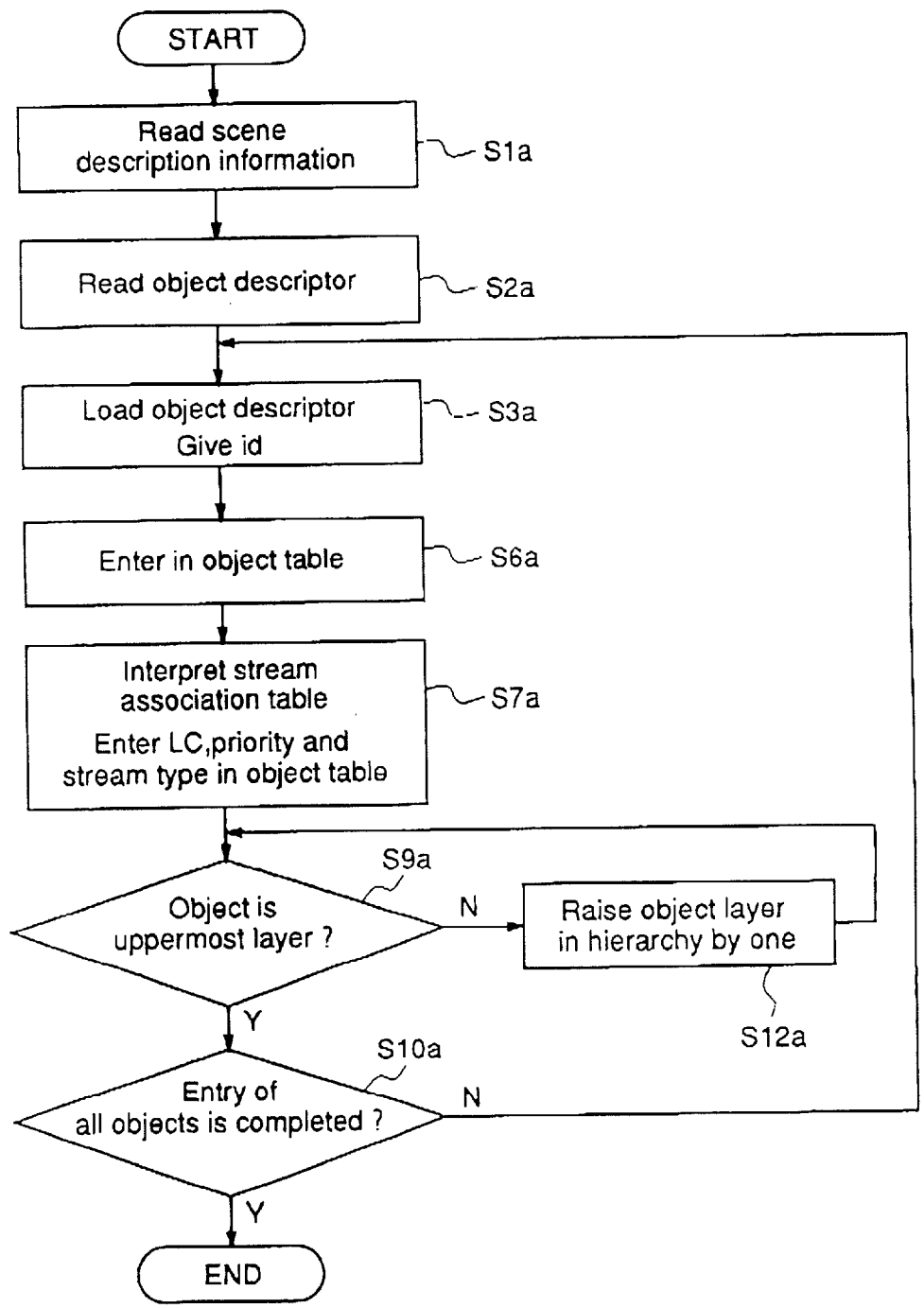
FIG. 16 is a diagram showing a flow of process steps by a CPU in the object data decoding apparatus according to the fifth embodiment.

Hereinafter, creating of the object table T3 following a flowchart in FIG. 16.

In step S1a, the scene description information Sf is read to the data storage means of the CPU 13a. In step S2a, the object descriptor OD is read to the data storage means of the CPU 13a. In step S3a, descriptors of respective objects of the scene description SDI on the basis of the scene description information Sf are loaded into an operating unit of the CPU 13a, and Oid of each object id is given to each descriptor, thereby an object can be identified by the corresponding object id.

In step S6a, the Oid is entered in the object table T3 as "id".

In step S7a, the object descriptor OD is interpreted. On the basis of the interpretation result, various table components of respective objects are entered in the object table T3. The components are the stream id, the priority, the stream type (Video or Audio) of each object. At this time, as the table components, indices of the upper and lower objects, stream indices of the upper and lower objects, and the common object indices are also entered in the object table T3.

In step S9a, it is decided whether the object which is being processed is in an upper most layer or not.

When decided in step S9a that the object is not in the upper most layer, in step S12a an object layer in hierarchy is raised by one, and then in step S9a, the decision step is performed again. On the other hand, when decided in step S9a that the object is in the upper most layer, in step S10a, it is decided whether table components of all objects have been entered in the object table T3 or not.

When decided in step S10a that the components have not been entered, the CPU performs step S3a again and the steps S6a, S7a, S9a, and S12a are performed. On the other hand, when decided the components have been entered, the CPU 13a completes creating the object table.

So created object table is stored in the data storage means of the CPU 13a. Each time the scene description information Sf and the object descriptor OD are updated, the stored table is also updated to describe newest information. Therefore, the object table remains unchanged unless an object of one scene is changed.

When there is a flag in a bit stream indicating that new scene description information Sf and the object descriptor OD have been transmitted, the object table may be updated only when the flag is transmitted.

Also in the object data decoding apparatus 105, the same effects as provided in the object data decoding apparatus 101 of the first embodiment are obtained.

Although iii the fifth embodiment, the object data decoding apparatus has been described as the object data processing apparatus in the system according to MPEG4, the object data selecting apparatus of the second embodiment, the object data recording apparatus of the third embodiment, the object data output apparatus of the fourth embodiment can respectively create the object table T3 from the scene description information Sf and the object descriptor OD.

In addition, in the object data decoding apparatus which receives the multiplexed bit stream MEg output from the data output apparatus, creating the object table is dispensed with, and therefore the same effects as in the fifth embodiment are obtained with a simple construction.

Although in this fifth embodiment, the objects and the object descriptors are defined without distinguishing the video data from the audio data, they may be defined with the video data being distinguished from the audio data as in the system 200 in FIG. 11. In this case, since the data type is clearly shown in the scene description, it is not necessary to describe the data type in the object descriptor.

Furthermore, a program which implements constructions of the processing apparatus and the recording apparatus is recorded in a data recording medium such as a floppy disc, whereby processings in the embodiments are carried out in an independent computer system with ease. This is described below.

Figure 17:
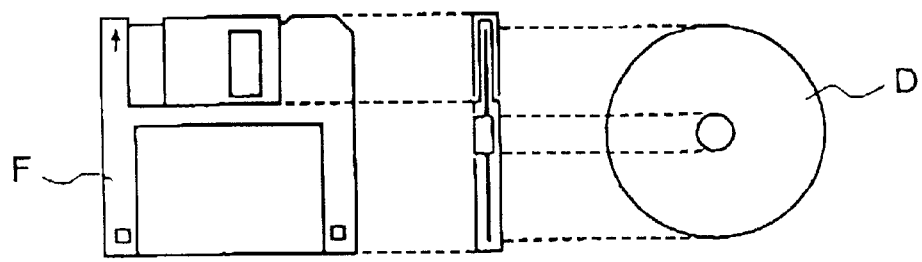
Figure 17:
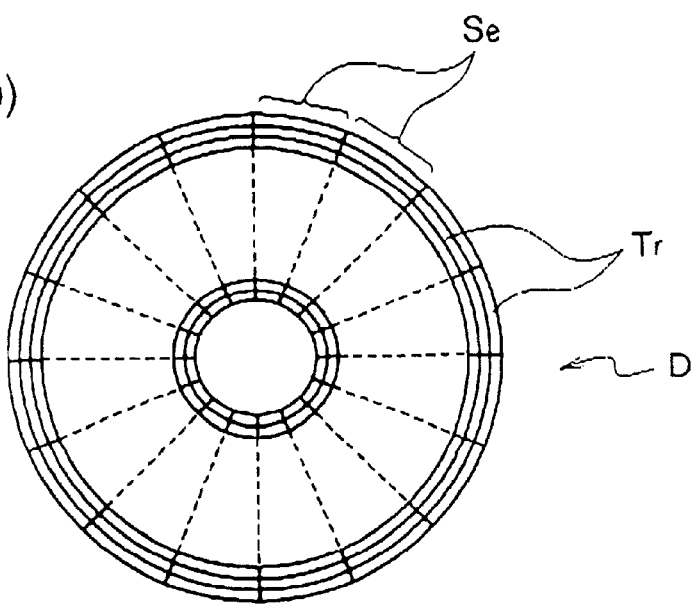
Figure 17:
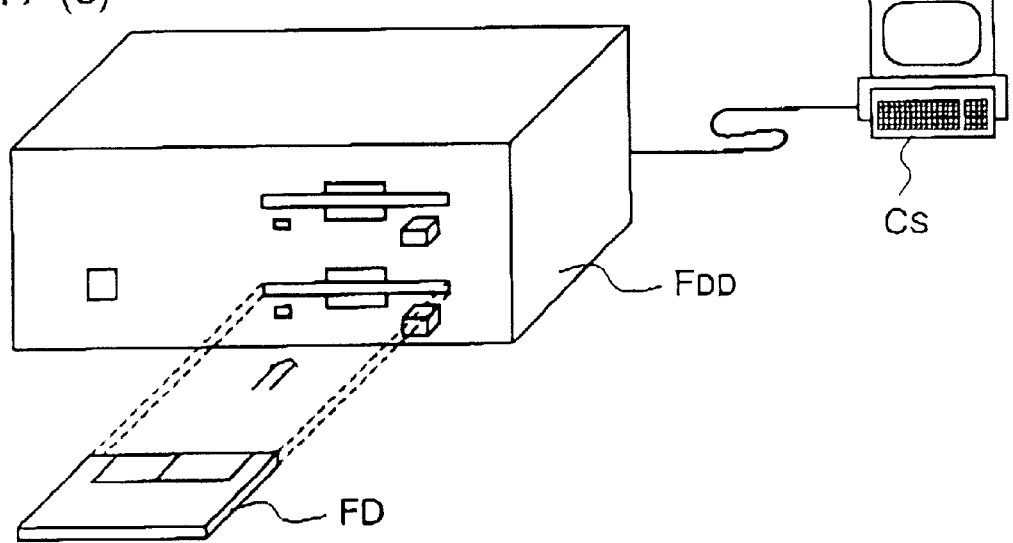

FIGS. 17(*a*) to 17(*c*) are diagrams showing signal processing of the object data processing apparatus and the object data recording apparatus of the embodiments in a computer system using a floppy disc which stores a program of the signal processing.

FIG. 17(*a*) shows a front appearance and a cross-section of a floppy disc FD, and a floppy disc body D as a recording medium, and FIG. 17(*b*) shows a physical format of the floppy disc body D.

Referring to FIGS. 17(*a*) and 17(*b*), the floppy disc body D is stored in a case F, and in a surface thereof, plural tracks Trs are formed concentrically from outer to inner radius thereof, each track being divided into 16 sectors Se in an angle direction. Data of the program is recorded in allocated areas on the floppy disc body D.

FIG. 17(*c*) is a diagram showing a construction with which the program is recorded/reproduced in/from the floppy disc FD. In case of recording the program in the floppy disc FD, data of the program is written thereto through the floppy disc drive FDD from the computer system Cs. In another case of constructing the image transmission method or image decoding apparatus in the computer system Cs using the program in the floppy disc FD, the program is read from the floppy disc FD by means of the floppy disc drive FDD and transferred to the computer system Cs.

Although image processing ill the computer system using the floppy disc as the data recording medium has been described, this image processing is implemented using an optical disc. Further, the recording medium is not limited thereto, and IC card, ROM cassette, or the like may be used so long as it can record a program.

Although the data recording medium which stores the program of transmission or decoding in the embodiments has been described, it may store the multiplexed bit stream MEg or non-multiplexed bit stream in the embodiments. The data storage means of the recording apparatus of the third embodiment may be realized using the data recording medium in FIGS. 17(*a*) to 17(*c*).

What is claimed is:

1. An object data processing apparatus for decoding N pieces of coded stream data (N=positive integer) obtained by compressively coding N pieces of object data which constitute individual data to be recorded or transmitted and have a hierarchical structure, for each object data, said apparatus including:

hierarchical information extraction means for extracting hierarchical information showing the hierarchical relationship of the N pieces of object data, according to the coded stream data; and table creation means for creating, according to the hierarchical information, an object table including first identifiers for identifying the respective object data and second identifiers for identifying coded stream data, corresponding to the respective object data, and showing a correlation between the respective second identifiers and the corresponding first identifiers as well as the hierarchical relationship of the object data.

2. An object data processing apparatus for decoding N pieces of coded stream data (N=positive integer) obtained by compressively coding scene data corresponding to one scene, for each of N pieces of objects constituting the scene, said apparatus including:

hierarchical information extracting means for extracting hierarchical information showing the hierarchical relationship of the respective objects constituting the scene, according to the coded stream data; and table creation means for creating, according to the hierarchical information, an object table including first identifiers for identifying the respective objects and second identifiers for identifying coded stream data, corresponding to the respective objects, and showing a correlation between the respective second identifiers and the corresponding first identifiers as well as the hierarchical relationship of the object data.

3. The object data processing apparatus of claim 2 wherein:

said hierarchical information extraction means is constructed so that it extracts priority information showing the priority order of the respective objects, according to the coded stream data, in addition to the hierarchical information; and said table creation means is constructed so that it creates, according to the hierarchical information and the priority information, an object table including first identifiers for identifying the respective objects, second identifiers for identifying coded stream data, corresponding to the respective objects, and priority information for showing the priority order of the respective objects, and showing a correlation between the respective second identifiers and the corresponding first identifiers as well as the hierarchical relationship of the object data.

4. The object data processing apparatus of claim 2 further including:

identification information detection means for detecting second identifiers correlated with first identifiers for identifying coded stream data of a specific object designated, with reference to the object table; and decoding means for extracting coded stream data of the specific object from the N pieces of coded stream data according to the second identifiers, and decoding the extracted coded strewn data.

5. An object data processing apparatus for decoding multiplexed data including N pieces of coded stream data (N=positive integer) obtained by compressively coding scene data corresponding to one scene, for each of N pieces of objects constituting the scene, said apparatus including:

hierarchical information extraction means for extracting hierarchical information showing the hierarchical relationship of the N pieces of objects constituting the scene, according to information showing the correlation of the respective coded stream data and included in the multiplexed data; and table creation means for creating, according to the hierarchical information, an object table including first identifiers for identifying the respective objects and second identifiers for identifying coded stream data, corresponding to the respective objects, and showing a correlation between the respective second identifiers and the corresponding first identifiers as well as the hierarchical relationship of the object data.

6. The object data processing apparatus of claim 5 wherein:

said hierarchical information extraction means is constructed so that it extracts priority information showing the priority order of the respective objects, according to the multiplexed data, in addition to the hierarchical information; and said table creation means is constructed so that it creates, according to the hierarchical information and the priority information, an object table including first identifiers for identifying the respective objects, second identifiers for identifying coded stream data corresponding to the respective objects, and priority information for showing the priority order of the respective objects, and showing a correlation between the respective second identifiers and the corresponding first identifiers as well as the hierarchical relationship of the object data.

7. The object data processing apparatus of claim 5 further including:

identification information detection means for detecting second identifiers correlated with first identifiers for identifying coded stream data of a specific object designated, with reference to the object table; and decoding means for extracting coded stream data of the specific object from the multiplexed data according to the second identifiers, and decoding the extracted coded stream data.

8. An object data processing apparatus for processing multiplexed data including N pieces of coded stream data (N=positive integer) and being partitioned into plural packets each having a prescribed code quantity, which coded stream data are obtained by compressively coding N pieces of object data which constitute individual data to be recorded or transmitted and have a hierarchical structure, for each object data, said apparatus including:

hierarchical information extraction means for extracting hierarchical information showing the hierarchical relationship of the N pieces of object data, according to information showing the correlation of the respective coded stream data and included in the multiplexed data; and table creation means for creating, according to the hierarchical information, an object table including first identifiers for identifying the respective objects and second identifiers for identifying coded stream data, corresponding to the respective objects, and showing a correlation between the respective second identifiers and the corresponding first identifiers as well as the hierarchical relationship of the plural packets constituting the multiplexed data.

9. An object data processing apparatus for processing multiplexed data including N pieces of coded stream data (N=positive integer) and being partitioned into plural packets each having a prescribed code quantity, which coded stream data are obtained by compressively coding scene data corresponding to one scene, for each of N pieces of objects constituting the scene, said apparatus including:

hierarchical information extraction means for extracting hierarchical information showing the hierarchical relationship of the respective objects constituting the scene, according to information showing the correlation of the respective coded stream data included in the multiplexed data; and table creation means for creating, according to the hierarchical information, an object table including first identifiers for identifying the respective objects and second identifiers for identifying coded stream data, corresponding to the respective objects, and showing a correlation between the respective second identifiers with the corresponding first identifiers as well as the hierarchical relationship of the plural packets constituting the multiplexed data.

* * * * *